US011762970B2

(12) United States Patent
Yanacek et al.

(10) Patent No.: US 11,762,970 B2
(45) Date of Patent: *Sep. 19, 2023

(54) FINE-GRAINED STRUCTURED DATA STORE ACCESS USING FEDERATED IDENTITY MANAGEMENT

(71) Applicant: Amazon Technologies, Inc., Seattle, WA (US)

(72) Inventors: David Craig Yanacek, Seattle, WA (US); Prashant Pandey, Pleasanton, CA (US)

(73) Assignee: Amazon Technologies, Inc., Seattle, WA (US)

(*) Notice: Subject to any disclaimer, the term of this patent is extended or adjusted under 35 U.S.C. 154(b) by 1061 days.

This patent is subject to a terminal disclaimer.

(21) Appl. No.: 15/431,708

(22) Filed: Feb. 13, 2017

(65) Prior Publication Data
US 2017/0155686 A1 Jun. 1, 2017

Related U.S. Application Data

(63) Continuation of application No. 14/108,247, filed on Dec. 16, 2013, now Pat. No. 9,569,634.

(51) Int. Cl.
*G06F 16/176* (2019.01)
*G06F 21/33* (2013.01)
(Continued)

(52) U.S. Cl.
CPC ........ *G06F 21/335* (2013.01); *G06F 16/1767* (2019.01); *G06F 16/1774* (2019.01); *G06F 21/6218* (2013.01); *H04L 63/0815* (2013.01)

(58) Field of Classification Search
CPC ... H04L 63/205; H04L 63/0815; H04L 63/12; H04L 63/083; G06F 21/335;
(Continued)

(56) References Cited

U.S. PATENT DOCUMENTS 6,487,552 B1 11/2002 Lei et al.
6,578,037 B1 * 6/2003 Wong ................. G06F 21/6227
707/694

(Continued)

FOREIGN PATENT DOCUMENTS

WO 2008020991 2/2008
WO 2012130782 10/2012
WO 2012150316 11/2012

OTHER PUBLICATIONS

Federated Identity Management in Foundations of Security Analysis and Design V, Chadwick, David W., Jan. 1, 2009, published by Springer Berlin Heidelberg, pp. 96-120.

(Continued)

*Primary Examiner* — Mariela Reyes
*Assistant Examiner* — Fatima P Mina
(74) *Attorney, Agent, or Firm* — Robert C. Kowert; Kowert, Hood, Munyon, Rankin & Goetzel, P.C.

(57) ABSTRACT

A structured data store service, such as a database service, may implement fine-grained access to data maintained at the database service using federated identity. Fine grained access requests may be received at a database service for specified data maintained for an application provider from a client of the application provider. An access credential may be also be received. Verification of the access credential may be obtained, and the database service may evaluate the fine-grained access request according to a delegation policy corresponding to the access credential to determine whether the fine-grained request is authorized. If authorized, the fine-grained access request may be service. If not authorized, the fine-grained access request may be denied. In some embodiments, multiple application clients may have the same authorization for data, such as read authorization, while another one or more application clients may have (Continued)

different authorization for the data, such as write authorization.

20 Claims, 14 Drawing Sheets

(51) Int. Cl.
*G06F 21/62* (2013.01)
*H04L 9/40* (2022.01)

(58) Field of Classification Search
CPC ......... G06F 21/6218; G06F 2221/2147; G06F 16/1767; G06F 16/1774
See application file for complete search history.

(56) References Cited

U.S. PATENT DOCUMENTS

| | | | |
|---|---|---|---|
| 7,346,923 B2 | 3/2008 | Atkins et al. | |
| 7,685,194 B2 | 3/2010 | Kabra et al. | |
| 8,166,404 B2* | 4/2012 | Grinstein | G06F 21/629 715/731 |
| 8,261,330 B2 | 9/2012 | Atkins et al. | |
| 8,930,714 B2 | 1/2015 | Glew et al. | |
| 8,955,035 B2 | 2/2015 | Belinkiy et al. | |
| 9,043,870 B1* | 5/2015 | Barenholz | H04L 63/0815 726/28 |
| 9,069,979 B2 | 6/2015 | Srinivasan et al. | |
| 9,098,675 B1 | 8/2015 | Roth et al. | |
| 9,401,918 B2* | 7/2016 | Lu | G06F 21/6218 |
| 9,569,634 B1 | 2/2017 | Yanacek et al. | |
| 2002/0083014 A1* | 6/2002 | Brickell | G06Q 10/10 705/76 |
| 2003/0145223 A1* | 7/2003 | Brickell | G06F 21/33 726/10 |
| 2004/0139043 A1* | 7/2004 | Lei | G06F 21/6227 |
| 2005/0038783 A1* | 2/2005 | Lei | G06F 21/6218 |
| 2005/0044197 A1* | 2/2005 | Lai | H04L 67/02 709/223 |
| 2005/0216465 A1 | 9/2005 | Dutta et al. | |
| 2005/0246338 A1 | 11/2005 | Bird | |
| 2005/0251865 A1* | 11/2005 | Mont | G06F 21/6245 726/26 |
| 2006/0129817 A1* | 6/2006 | Borneman | G06F 21/41 713/170 |
| 2007/0156897 A1* | 7/2007 | Lim | G06Q 10/10 709/225 |
| 2008/0052291 A1* | 2/2008 | Bender | G06F 21/6227 |
| 2008/0168539 A1 | 7/2008 | Stein | |
| 2009/0064342 A1* | 3/2009 | Chan | G06F 21/6218 726/27 |
| 2010/0050233 A1* | 2/2010 | Ross | G06F 21/33 726/2 |
| 2010/0100924 A1* | 4/2010 | Hinton | G06F 21/10 726/1 |
| 2010/0257578 A1* | 10/2010 | Shukla | H04L 9/3234 726/1 |
| 2010/0262625 A1* | 10/2010 | Pittenger | G06F 21/604 707/783 |
| 2012/0054489 A1* | 3/2012 | Ranzini | G06F 16/24575 713/165 |
| 2012/0159577 A1* | 6/2012 | Belinkiy | G06F 21/6218 726/4 |
| 2012/0303629 A1 | 11/2012 | Klein et al. | |
| 2012/0324237 A1 | 12/2012 | D'Souza et al. | |
| 2013/0144901 A1* | 6/2013 | Ho | G06F 16/2456 707/769 |
| 2014/0006095 A1* | 1/2014 | Doran | G06Q 10/10 705/7.28 |
| 2014/0020051 A1* | 1/2014 | Lu | G06F 21/6218 726/1 |
| 2014/0052749 A1* | 2/2014 | Rissanen | G06F 21/6227 707/759 |
| 2014/0123207 A1 | 5/2014 | Agarwal et al. | |

OTHER PUBLICATIONS

Singh, et al., Dynamic Federation in Identity Management for Securing and Sharing Personal Health Records in a Patientcentric Model in Cloud, International Journal of Engineering and Technology, vol. 5, No. 3, published Jul. 2013.

* cited by examiner

US 11,762,970 B2

FINE-GRAINED STRUCTURED DATA STORE ACCESS USING FEDERATED IDENTITY MANAGEMENT

This application is a continuation of U.S. patent application Ser. No. 14/108,247, filed Dec. 16, 2013, now U.S. Pat. No. 9,569,634, which is hereby incorporated by reference herein in its entirety.

BACKGROUND

Database systems provide back-end data storage and manipulation for countless applications, services, or systems. Typically, these applications, services, or systems may access a database in order to perform various functions. For example, a back-end database for a blog application may store entries, comments, images, and other information in a database maintaining content for the blog application. The blog application may access these entries, comments, images, or other information in order to display the content for the blog application on a website. With the advent of the Internet, the number of applications, services, or systems continues to grow, increasing the amount and complexity of information maintained by database systems for other applications. Cloud computing, content delivery networks, data storage, social media, gaming, messaging, and e-commerce are just some of the applications, systems, or services relying upon database systems.

The growth in applications, systems, or services relying upon database systems also prevents a challenge to database systems to provide more efficient and secure access to data maintained in respective databases. Some applications, services, or systems are operated by multiple users, implement multiple components, nodes, or subsystems with differing functions, or otherwise may need to provide or access different data maintained in a database system. Thus, access controls to data maintained in a database system are also often implemented by applications, systems, or services in order to ensure that the correct data for the various users, components, nodes, or subsystems in secure and efficient ways. However, burdening the applications, systems, or services with providing access control may reduce efficiency (e.g., creating an access bottleneck), increase costs (e.g., implementing additional components such as middle tiers), and introduce additional security vulnerabilities (e.g., SQL injection attacks).

Figure 1A:
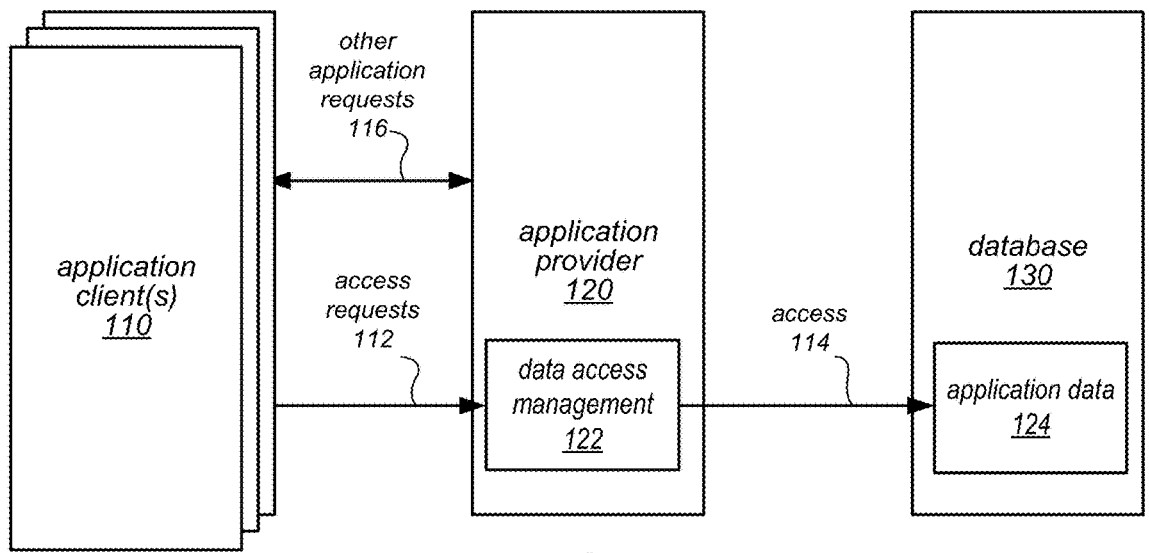
FIG. 1A is a block diagram illustrating fine-grained access to a database via an application provider, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Systems and methods described herein may be employed in various combinations and in various embodiments to implement fine-grained structured data store (e.g., a database) access using federated identity management. Structured data stores, such as database systems or services, may maintain data for applications to access as part of performing various application functions or operations. Some of these applications may be network-based applications offered by application providers to many different application clients, some of which may need to access some or all of the application data in order perform these various application functions and operations. Structured data stores, such as database systems, may process fine-grained access requests from application providers and application clients in order to ensure authorized access to the application data. A fine-grained access request may be, in various embodiments, a request to obtain access to specified portions of data maintained in a structured data store, such as database, for which the requestor is authorized, such as specific rows, columns, or attributes, according to the requestor's identity, role, or attribute. Authorization may be delegated, such as by an application provider, and access granted according to the delegated authority. In various embodiments, fine-grained access requests may appear (at least to the requesting system) to be simple access requests. If for example, a database maintaining patient lists for doctors implements fine-grained access control so that doctors only see their own patient's information, a patient information application may send a list patients request, and fine-grained access may limit authorization to obtaining only those patients as are associated with the doctor making the request. Fine-grained access requests may be received at the structured data store along with a delegated access credential. Verification of the access credential may be obtained, and the fine-grained access request may be evaluated according to a delegation policy corresponding to the access credential in order to determine authorization for the fine-grained access request. In some embodiments, the same delegation policy may be used to evaluate other fine-grained access requests along with different access credentials.

Network-based applications introduce new challenges to performing the various services, functions, or operations provided by the application. A provider of a network-based application, referred to herein as an application provider, may offer one or more applications as part of a service, a stand-alone application, or any other kind of system or application for application clients. An application provider may maintain data in a structured data store, such as a database service, in order to maintain data for performing various operations of the application. For example, application data may include, but is not limited to content provided by the application provider and/or application clients, state information of the application and/or application clients, settings, variables, or any other type of data that an application may use to perform its respective operations, services, or functions. As applications may have many application clients, in some embodiments, the application clients may need to access the application data maintained in the structured data stores, in order to perform.

For example, FIG. 1A illustrates application provider 120, which may offer, sell, support, or otherwise provide an application to multiple application client(s) 110. For example, application provider 120 may provide a gaming application to application client(s) 110. Application client(s) 110 may be implemented on one or more computing devices configured to implement the application client(s) 110, such as computing system 2000 described below with regard to FIG. 12. Various other application requests 116, such as download requests to obtain the application, registration, billing, updates, current state information, etc . . . , may be sent and received between application client(s) 110.

For some operations, the application on application client(s) 110 may use data maintained in application data 124 by application provider 120 in database system 130. However, a specific application client may not need all of application data 124 in order to perform operations for the specific application client, so application provider 120 may restrict or authorize access to only certain portions of application data 124. In this example, application provider 124 may implement a three-tiered architecture for access requests from application client(s) 110 to application data 124 in database 130. As illustrated in FIG. 1A, application client(s) 110 may send access requests 112 (e.g., SQL statements, or requests formatted according to an API for the application) to obtain access to the specific information in application data 124 to application provider 120, which may operate a middle-tier component or platform. This middle tier component or platform may provide data access management 122 to ensure that access request 112 accesses data for which it is authorized. Data access management 122 may then send authorized access requests 114 to database 130, which may service the request.

A three-tiered architecture for ensuring authorized access to data, as illustrated in FIG. 1A, places the burden of access control on application provider 120. With the fiercely competitive market for developing new or improved network-based applications, also developing efficient and reliable access controls for network-based applications (especially those web-based applications that are highly utilized and available via the Internet) may increase time, complexity, and/or costs for providing new applications.

Figure 1B:
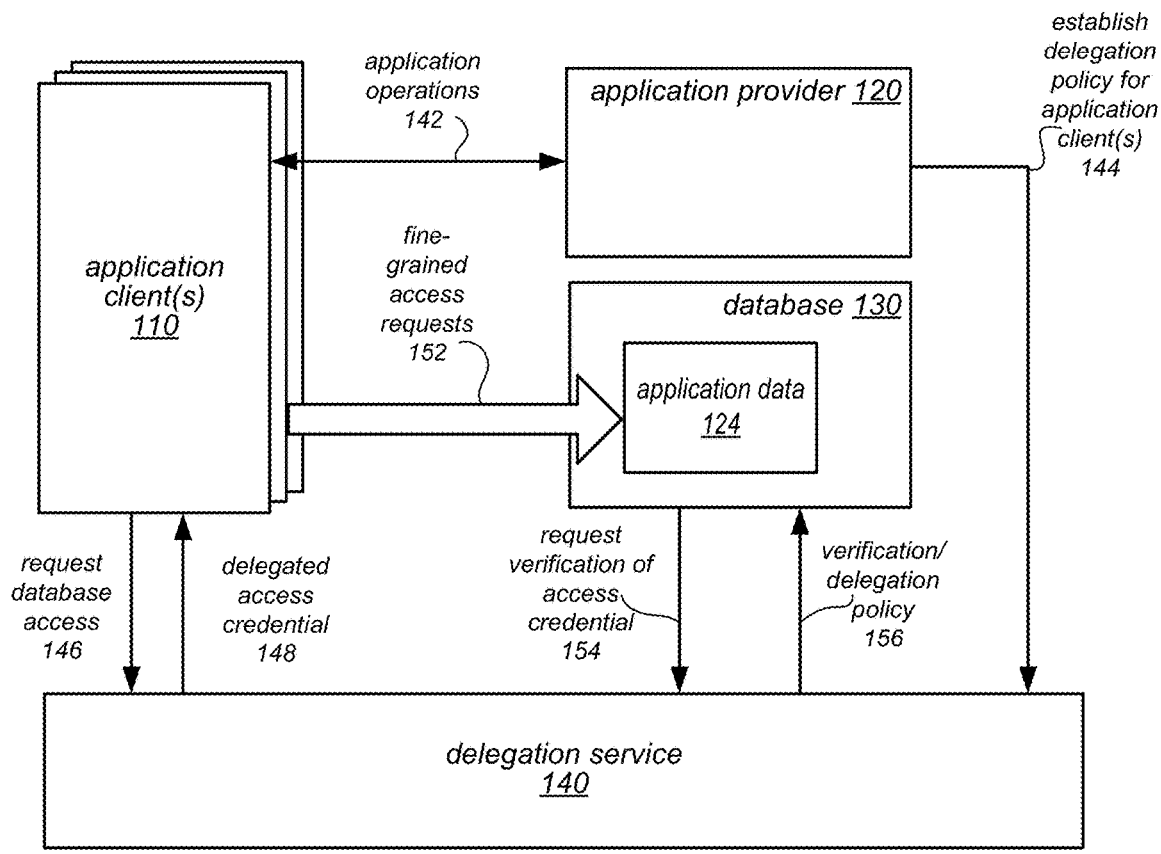
FIG. 1B is a block diagram illustrating fine-grained access to a database using federated identity management, according to some embodiments.

Various embodiments may implement fine-grained structured data store access using federated identity, removing the necessity of a middle tier for control access to application data (although a middle tier may be implemented for various other application operations) FIG. 1B illustrates is a block diagram illustrating fine-grained access to a database using federated identity management, according to some embodiments. As discussed in FIG. 1A above, application provider 120 may provide application clients 110 with an application for performing various services, functions, and/or operations. Application provider 120 may maintain application data 124 in database 130 and may establish a delegation policy for application clients 144 with a delegation service 140. In some embodiments, delegation service 140 may maintain delegation policies corresponding to delegated access credentials issued to verified application clients in order to delegate authorization to access specified portions of application data 124. Thus, in at least some embodiments, delegation service 140 may be implemented to provide federated identity management. Other application operations 142, such as requests to obtain the application, registration, billing, updates, current state information, etc . . . , may be communicated between application client(s) 110 and application provider 120.

In order to access application data 124, application client(s) 110 may request database access 146 from delegation service 140 (which may also maintain information about the various users, clients, customers, accounts, etc.) in order to determine whether to issue an access credential to application client(s) 110. In some embodiments, an identity credential may be included with the request for database access, which delegation service 140 may be able to validate. Web federated identity management may be implemented by delegated service 140, in some embodiments, such that the identity credential may have been issued by a third-party identity provider with which delegation service 140 can validate the identity credential. If validated, a delegated access credential 148 may be provided to application client(s) 110. In at least some embodiments, the delegated access credential may expire after a certain time period (e.g., 1 hr.).

Figure 1C:
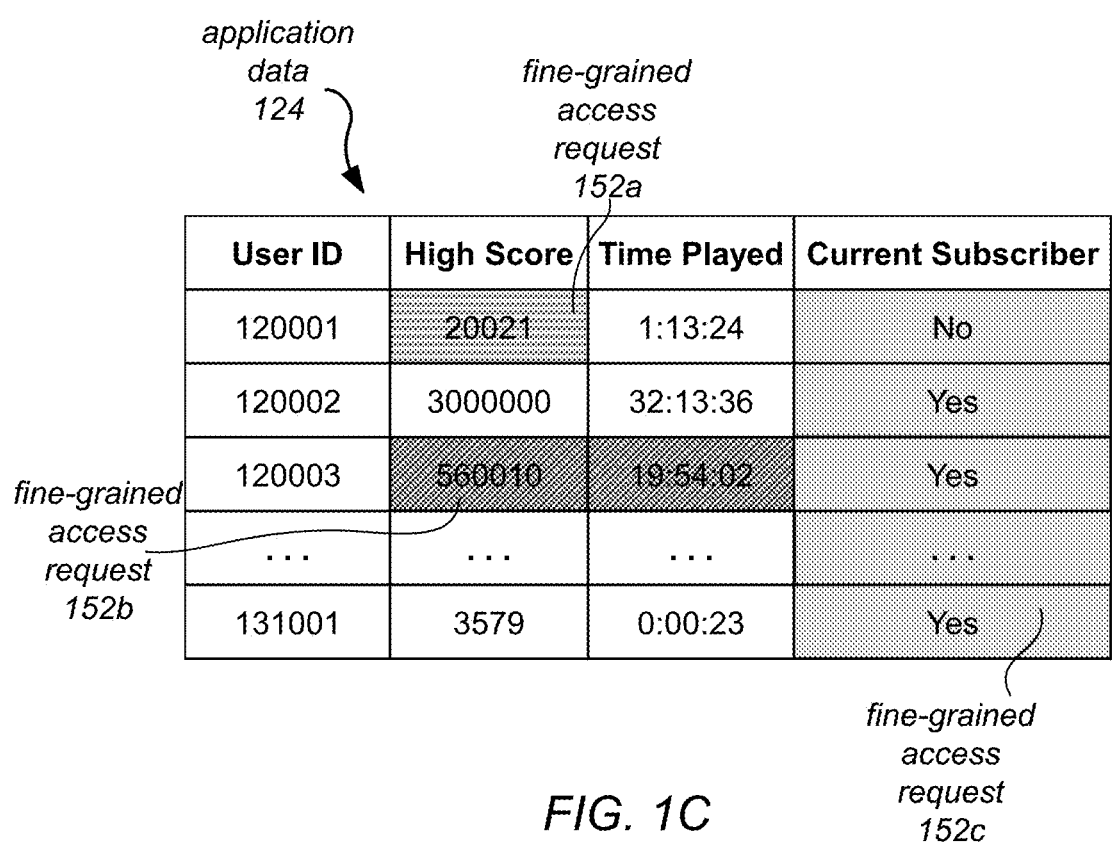
FIG. 1C is an example of application data in a database table to which fine-grained access requests may be made, according to some embodiments.

In various embodiments, application client(s) 110 may directly send fine-grained access requests 152 to database 130. For example, if application client(s) 110 are different users of a gaming application provided by application provider 120, then application data 124 may be a database table storing information for the operation of the game. FIG. 1C illustrates an example database table storing game information for different users. In application data 124, User ID, High Score, Time Played, and Current Subscriber values are maintained for users. Thus, if the gaming application on an application client 110 wishes to display the user's high score (or update the high score), the application client 110 may send a fine-grained access request 152a to database 130.

Along with the fine-grained access request 152, a delegated access credential, such as obtained at 148, may be provided to database 130. In some embodiments, database 130 may request verification of the delegated access credential 154 from delegation service 140. Delegation service 140 may be able to verify the access credential (which it may have issued) and send verification of the access credential 156 to database 130. In some embodiments, delegation service 140 may also send a delegation policy 156 corresponding to the access credential. A delegation policy may be the delegation policy established by application provider 120 at 144, for the specific application client or type of role of the application client. Continuing with the gaming application example from above, application provider 120 may establish a delegation policy for "Players." The delegation policy may authorize access operations to specific portions of application data. For example, the delegation policy may authorize read or write operations for game players for only data associated with their respective User ID. Thus, if the fine-grained access request 152b received from a client application 110 was identified as User ID 120001, then the fine-grained access request may restrict authorization to information in the same row as User ID 120003, such as a high score of 20021 and time played 1:13:24. In some embodiments, authorization to perform certain actions may be delegated on a per field basis. For example High Score may be writeable by game applications, as may Time Played. Current Subscriber, which may indicate whether or not a game player may still play the game, for example may be restricted to read (or no access at all as access to the field is not illustrated by the shaded gray box in FIG. 1C for request 152b). Multiple delegation policies may be maintained for different application clients or different roles (e.g., game player, game administrator), and the different delegation policies may authorize different actions for the same specified data. For example, the game player delegation policy may only allow read operations for the Current Subscriber column and the User ID column, while an administrator policy may allow for all fields to be written. In some embodiments delegation policies may restrict access to particular columns, such as a access manager policy may allow access to the field values which indicate whether a User ID is still a current subscriber, as illustrated by fine-grained access request 152c in FIG. 1C.

Once database 130 has obtained the delegation policy corresponding to the verified delegated access credential for fine-grained access request 152, the fine-grained access request 152 may be evaluated to determine authorization for the fine-grained access request 152 according to the delegation policy corresponding to the fine-grained access request 152. If, the access credential identifies the request as for a game player, as in the example above, the player delegation policy may be used to evaluate the request. In some embodiments, the delegation policy may act as a template, macro, or other type of function that when provided with details about the requesting application client 110, such as an identity, user id, etc . . . , the authorization rules specific to the requestor may be determined. For example, if the fine-grained access request, is a read request for certain data, such as High Score in FIG. 1C, with access credentials identifying the application client 110 as a game player, then information about the application client 110, such as User ID, may be used to generate or identify the rules for authorization. The delegation policy may generally authorize players to read the High Score value associated with their User ID, then authorization rules may allow for read requests where that request is the High Score value of User ID 120001 (which may have been the requesting user). If the access request is authorized, then the fine-grained access request may be serviced (e.g., perform the request action, such as reading the data, writing to the data, etc . . . ). If the access request is not authorized, then a denial may be sent back to application client 110 denying the application request. In some embodiments, the requested data may be first obtained, and then analyzed based on the text values of the entries or metadata describing the entries, with data for which access is prohibited by the delegation policy removed from any data provided to application client 110.

Many different applications may be able to make use of fine-grained database access using federated identity management. For example, a messaging application may provide a single application client with read authorization and a single client with write authorization, while in another example, an analytics application may allow for multiple client applications to have write access, while another single client application may have read access. Moreover, the delegation of access authority to specific roles performed by application client, (e.g., player, administrator) may allow for the same delegation policy to be applied to new clients that are performing one of the already established roles, without having to have the application provider generate a specific delegation policy for each application client.

The illustrations in FIGS. 1A-1C are not intended to be limiting as to other ways to implement fine-grained database access using federated identity management. For example, delegation service 140 may be broken up into two separate services, one which provides access credentials, and another which provides delegation policies. FIG. 1C, in another example, may not be construed as limiting the data to a single type of application, (e.g., gaming), but may be many other types of applications or services. Moreover, the data format in the database table is merely provided for an example, as many other data arrangements and formats for database systems are well-known to those of ordinary skill in the art.

This specification begins with a general description of an example structured data store service, a database service, and a delegation service implemented by a network-based services platform, which may provide fine-grained access to data maintained at the database service using federated identity management to various application clients. Then various examples of a database service and a delegation service are discussed, including different components/modules, or arrangements of components/module that may be employed as part of implementing a database service and a delegation service. Various interactions between application clients, a database service, a delegation service, as well as other systems, such as an identity provider, are described, as well as the various configurations of application clients that may utilize fine-grained access. A number of different methods and techniques to implement fine-grained access for a database using federated identity management are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
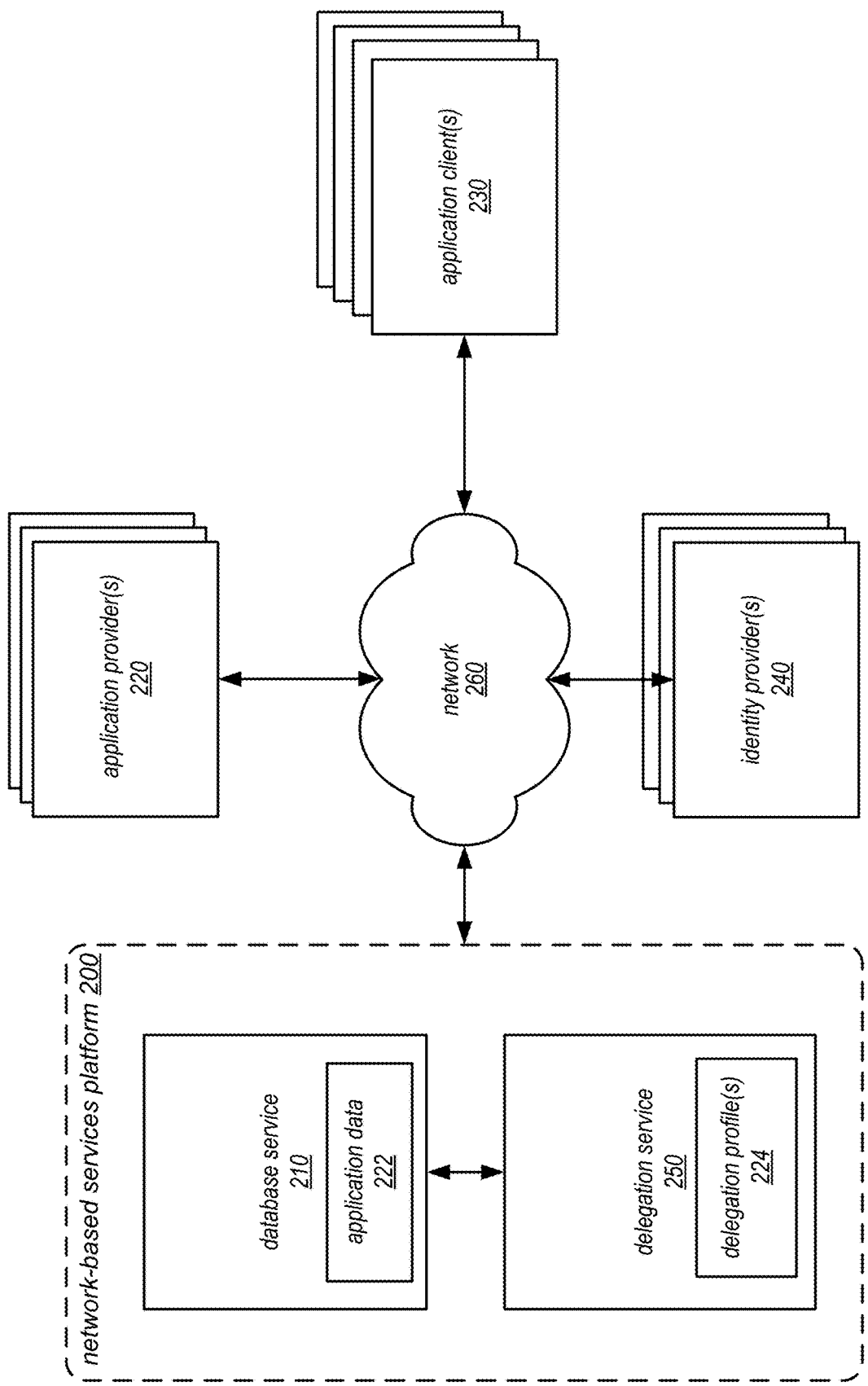
FIG. 2 is a block diagram illustrating an operating environment for a database service using a delegation service for federated identity management, according to some embodiments.

FIG. 2 is a block diagram illustrating an operating environment for a database service using a delegation service for federated identity management, according to some embodiments. In some embodiments, a database may be operated, maintained, and/or implemented as a network-based service. For example, a network-based database service may provide database functionality, data storage, access operations, queries, etc. to database clients, such as application clients or application providers, over a network. The network-based database service may be implemented as part of a platform of network-based services, including other network-based services such as a delegation service. A network-based database service may use a delegation service to provide federated identity management for clients of the database service in order to provide fine-grained access to data maintained by the database service.

For example, in various embodiments, database service 210 may provide a database back-end for an application provided by application provider 220. A client application 230 (or other component of the application) may submit fine-grained access requests to database service 210 over network 260 in order to perform various application functions. In some embodiments, application client 230 and/or application client 220 may first communicate with delegation service 250, and possibly identity provider 240, in order to establish or receive delegation access credentials to submit with the fine-grained access request. Database service 210 may then obtain a delegation profile corresponding to the access credential from delegation service 250. The fine-grained access request may then be evaluated with respect to the delegation profile, and if authorized, the fine-grained access request may be serviced.

It is noted that where one or more instances of a given component may exist, reference to that component herein may be made in either the singular or the plural. However, usage of either form is not intended to preclude the other. In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than database service 210 component).

As illustrated in FIG. 2 various systems, components, or devices, such as application provider(s) 220, application client(s) 230, and identity provider(s) 240 may be configured to interact with a network-based services platform 200 via a network 260. Network 260 may be the Internet, a wide area network, a local area network, or any other network or combinations thereof. Network-based services platform 200 may be implemented by numerous data centers (which may be distributed across different geographical regions) hosting various resource pools, such as collections of physical and/or virtualized computer servers, storage devices, networking equipment and the like, such as computing system 2000 described below with regard to FIG. 12, needed to implement, configure and distribute the infrastructure and services offered by the platform. Network-based services platform 200 may be configured to implement (and interface with) database service 210, delegation service 250 and/or one or more other virtual computing services (not illustrated).

Generally speaking, application provider(s) 220, application client(s) 230, and identity provider(s) 240 may be considered clients of network-based services platform 200, and/or services implemented by network-based services platform 200, such as database service 210 and delegation service 250. Therefore, application provider(s) 220, application client(s) 230, and identity provider(s) 240, may encompass any type of module, system, device, application, or component configurable to submit network-based services requests to network-based services platform 200 (or directly to services implemented by network-based services platform 200) via network 260, including requests for database services (e.g., a query, etc.). For example, a given client of network-based services platform 200 may include a suitable version of a web browser, or may include a plug-in module or other type of code module configured to execute as an extension to or within an execution environment provided by a web browser. Alternatively, application provider(s) 220, application client(s) 230, and identity provider(s) 240 may include sufficient protocol support (e.g., for a suitable version of Hypertext Transfer Protocol (HTTP)) for generating and processing network-based services requests without necessarily implementing full browser support for all types of network-based data. Thus, clients such as application provider(s) 220, application client(s) 230, and identity provider(s) 240 may be configured to interact directly with network-based services platform 200. In some embodiments, application provider(s) 220, application client(s) 230, and identity provider(s) 240 may be configured to generate network-based services requests according to a Representational State Transfer (REST)-style network-based services architecture, a document- or message-based network-based services architecture, or another suitable network-based services architecture.

Application provider(s) 220, application client(s) 230, and identity provider(s) 240 may convey network-based services requests (e.g., fine-grained access requests, credential access requests, verification requests, etc . . . ) to and receive responses from network-based services platform 200 as well as each other via network 260. In various embodiments, network 260 may encompass any suitable combination of networking hardware and protocols necessary to establish network-based communications among application provider(s) 220, application client(s) 230, and identity provider(s) 240, and platform 200. For example, network 260 may generally encompass the various telecommunications networks and service providers that collectively implement the Internet. Network 260 may also include private networks such as local area networks (LANs) or wide area networks (WANs) as well as public or private wireless networks. For instance, application provider 220 may have a separate network for communication with database service 210 that is separate from a network for communicating with application clients 230 or other systems, in some embodiments. In another example, both given application provider(s) 220, application client(s) 230, identity provider(s) 240 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between application provider(s) 220, application client(s) 230, and/or identity provider(s) 240 and the Internet as well as between the Internet and network-based services platform 200. It is noted that in some embodiments, application provider(s) 220, application client(s) 230, and identity provider(s) 240 may communicate with network-based services platform 200 using a private network rather than the public Internet. For example, application provider(s) 220, application client(s) 230, and/or identity provider(s) 240 may be provisioned within the same network-based services platform 200, or other network resources provider. In such a case, application provider(s) 220, application client(s) 230, and/or identity provider(s) entirely through a private network 260 (e.g., a LAN or WAN that may use Internet-based communication protocols but which is not publicly accessible).

In various embodiments, application provider(s) 220 may be one or more computing systems or devices that generate, distribute, support, manage, or otherwise provide applications, services, or other functions to clients. For example, as noted above, application providers 220 may be content delivery providers (e.g., audio, video, e-books), gaming platforms (e.g., online game servers), messaging applications, analytics platforms, e-commerce platforms, as well as any other application that may maintain data in a database system as part of performing the various functions of an application. Application providers 220 may create and/or manage application data 222 which may be maintained in a database, such as database service 210, in order for applications provided by application provider(s) 220 to perform their respective functions. For example, application provider 220 may be a secure messaging service, and may create new entries/tables/object for messages between one or more application client(s) 230 utilizing the secure messaging service. Similarly, application data providers 220 may be configured to create, manage, modify, or delete delegation profiles 224 corresponding to delegated access credentials (which may correspond to a specific client/user identity) that are maintained at delegation service 250 which authorize various fine-grained access operations for application data 222. For example, the secure messaging service given above may be configured to create delegation profiles 224 that only allow specific clients to read message data from specified locations in application data 222 maintained in database service 210. Application provider(s) 220 may be implemented on one or more computing devices such as one or more servers, nodes, or other computing devices (e.g., computing system 2000 described below with regard to FIG. 12).

Application providers 220 may also provide various other support, management, administrative, or other functions for the operation of applications by application client(s) 230, which may not utilize application data 222. For example, application provider(s) 220 may register new users for the secure messaging service, distribute application updates, enforce application performance rules/policies, etc . . . . However, in various embodiments, application provider(s) 220 may not provide access management for application data 222 (e.g., not acting as a middle tier component).

Application client(s) 230 may be one or more computing systems or devices that implement/utilize the one or more applications provided by application providers 220. For example, application clients may be media players/devices (e.g., audio, video, e-books), gaming systems/applications (e.g., network-based game clients), messaging applications (secure message clients), analytics display and analysis tools, e-commerce interfaces, as well as any other application that may access data maintained in a database system by application provider(s) 230 as part of performing the various functions of an application. In some embodiments, application client(s) 230 may be configured to provide access to network-based services platform 200, such as database service 210, delegation service 220, and/or other virtual computing services (not illustrated) in a manner that is transparent to users of the application client(s) 230. For example, application client 230 may be configured to access data maintained at database service 210 (e.g., obtain a recently received secure message) such that a user of application client 230 is unaware of communications to database service 210 and/or delegation service 250. In various embodiments, application client(s) 230 may not need to be modified to make use of the service model of FIG. 2. Instead, the details of interfacing to network-based services platform 200, database service 210, application provider(s) 220, identity provider(s) 240, and delegation service 250 may be coordinated by application client(s) 230 and the operating system or file system on behalf of applications executing within the operating system environment at application client(s) 230.

Figure 12:
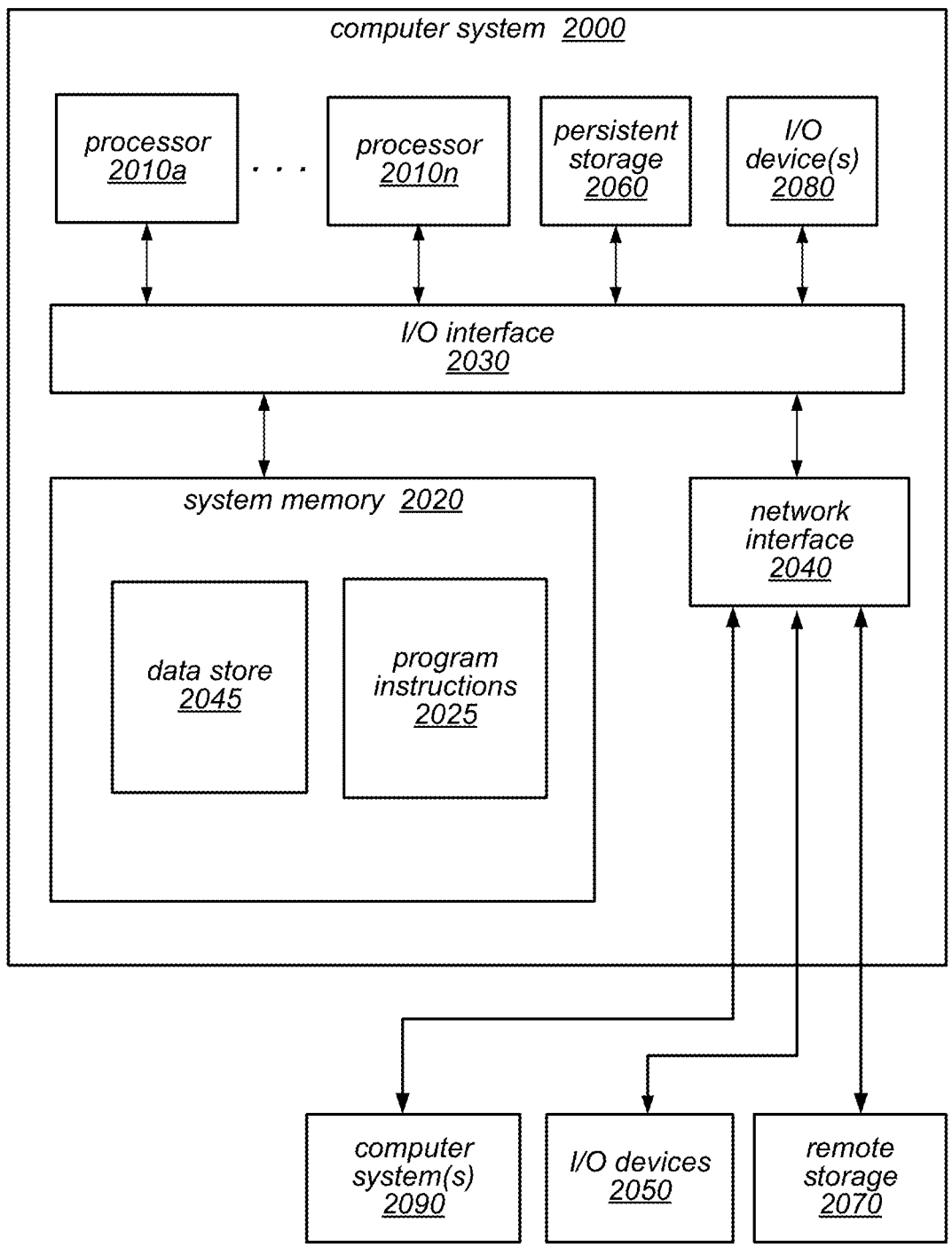
FIG. 12 a block diagram illustrating an example computing system, according to some embodiments.

Identity provider(s) 240 may be one or more systems or services implemented on one or more computing systems or devices (such as computing system 2000 described below with regard to FIG. 12) that provide identity credentials to requestors in response to authenticating requestors. Identity provider(s) 240 may be third-party providers, those controlled by a separate entity than either the database service 210, delegation service 250, application provider(s) 220, etc . . . , or, in some embodiments, may be included as a service as part of network-based services platform 200. In various embodiments, identity provider(s) 240 may have established trust relationships with application provider(s) 220 and/or delegation service 250 (or network-based services platform 200) to authenticate the identity of users/clients. For example, application client 240 may, in some embodiments, submit an authentication request for an identity token to a social media service, email service, e-commerce service, or other web-service platform that authenticates users in order to obtain the identity token. Identity provider(s) 240 may also be able to validate or verify identity credentials submitted to delegation service 250 in order to obtain delegated access credentials.

In various embodiments, network-based services platform 200 may implement many different services including database service 210, and delegation service 250. Generally speaking, network-based services platform 200 may be configured to implement one or more service endpoints configured to receive and process network-based services requests, such as requests to access data (or records thereof) in database service 210 or requests to create delegation policies at delegation service 250. For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from application provider(s) 220, application client(s) 230, and identity provider(s) 240 and to forward them to components of a system that implements database service 210, delegation service 250 and/or another virtual computing services for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting application client(s) 230, the number and/or frequency of client requests, the size of data (such as database tables or records thereof) stored or retrieved on behalf of application provider(s) 220, overall storage bandwidth used by application provider(s) 220, class of storage requested by application provider(s) 220, or any other measurable usage parameter. Platform 200 may also implement financial accounting and billing systems, or may maintain a database of usage data that may be queried and processed by external systems for reporting and billing of usage activity. In certain embodiments, platform 200 may be configured to collect, monitor and/or aggregate a variety of operational metrics for services 210 and/or 250, such as metrics reflecting the rates and types of requests received from application clients 230 or application provider(s) 220, bandwidth utilized by such requests, system processing latency for such requests, system component utilization (e.g., network bandwidth and/or storage utilization within the storage service system), rates and types of errors resulting from requests, characteristics of stored and requested data or records thereof (e.g., size, data type, etc.), or any other suitable metrics. In some embodiments such metrics may be used by system administrators to tune and maintain system components, while in other embodiments such metrics (or relevant portions of such metrics) may be exposed to application provider(s) 220 to enable such clients to monitor their usage of database service 210, delegation service 250 and/or another virtual computing services (or the underlying systems that implement those services).

It is noted that while network-based services platform 200 may represent the primary interface through which application provider(s) 220, application client(s) 230 may access the database service 210 or delegation service 250, it need not represent the sole interface to such features. For example, an alternate API that may be distinct from a network-based services interface may be used to allow clients internal to the enterprise providing the database service 210 and delegation service 250 to bypass network-based services platform 200. Note that in many of the examples described herein, database service 210 may be internal to a computing system or an enterprise system, such as application provider 220 that provides services to application clients 230, and may not be exposed to external clients (e.g., users of client applications).

Figure 3:
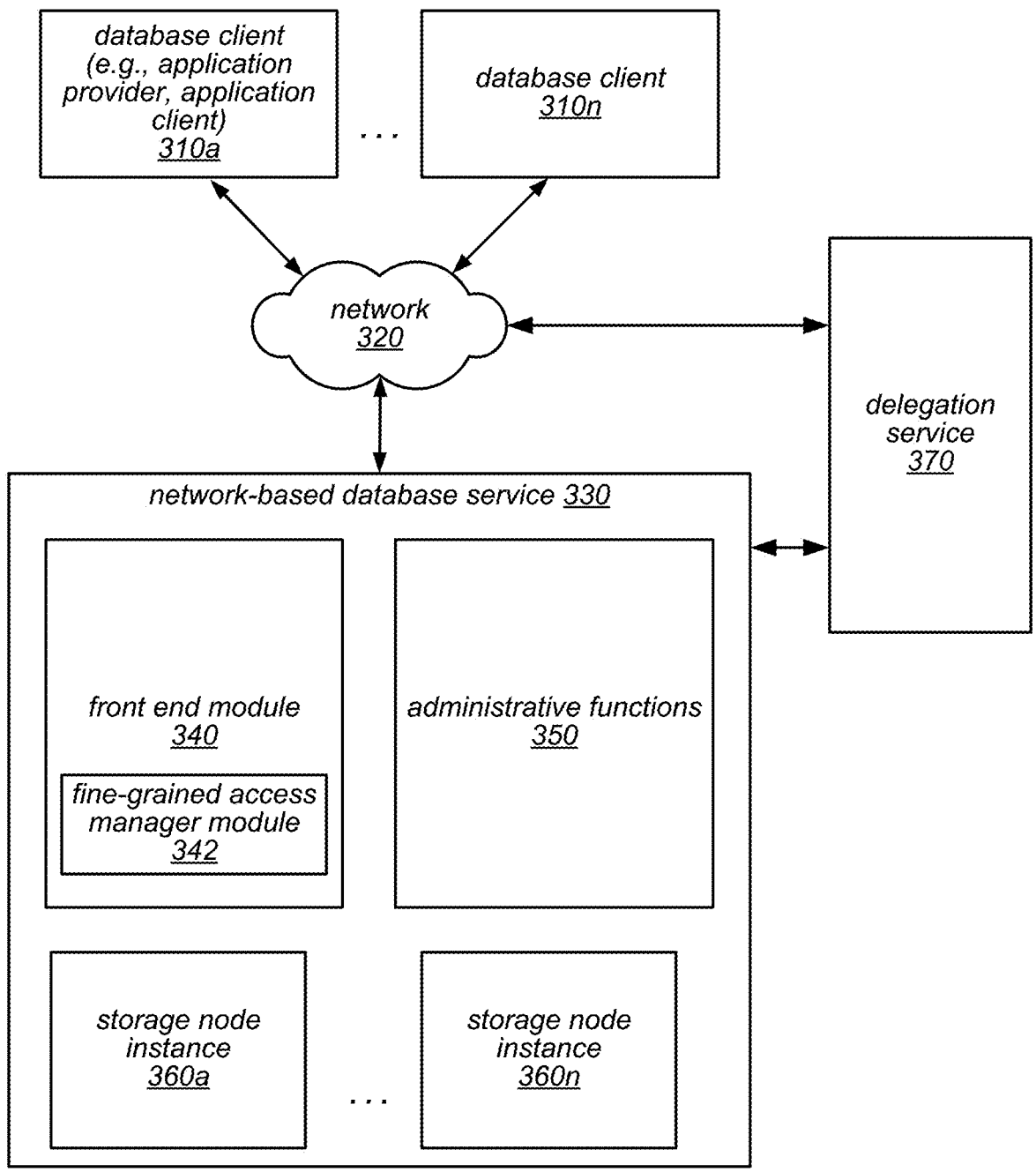
FIG. 3 is a block diagram illustrating a database service, according to some embodiments.

Database service 210 is illustrated in FIG. 2 as implemented as part of network-based services platform 200. However, a database system or structured data store service implementing fine-grained access controls to data maintained at the database system or structured data store service may also be implemented independently of the network-based services platform. FIG. 3 is a block diagram illustrating a database service, according to some embodiments, which may be implemented either as part of a network-based services platform or as a standalone service. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as computing system 2000 in FIG. 12 described below. In various embodiments, the functionality of a given computing system component may be implemented by a particular computing node or may be distributed across several computing nodes. In some embodiments, a given computing node may implement the functionality of more than one database service system component.

Generally speaking, database clients 310*a*-310*n* may encompass any type of client configurable to submit web services requests to network-based database service 330 via network 320, such as application provider(s) 220 or application client(s) 230 described above. For example, a given database client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based database service 330. Alternatively, a database client 310 may encompass an application such as a database application, media application, office application or any other application that may make use of persistent storage resources (such as application provider(s) 220 and application client(s) 230). In various embodiments, a database client, such as database client 310*b*, may be configured to request a delegated access credential from delegation service 370 (described in greater detail below with regard to FIG. 4). In various embodiments, a database client, such as database client 310*b* may be configured to submit fine-grained access requests along with delegated access credentials to database service 330. In some embodiments, such an application may include sufficient protocol support (e.g., for a suitable version of Hypertext Transfer Protocol (HTTP)) for generating and processing web services requests without necessarily implementing full browser support for all types of web-based data. That is, database client 310 may be an application configured to interact directly with network-based database service 330. In various embodiments, database client 310 may be configured to generate web services requests according to a Representational State Transfer (REST)-style web services architecture, a document- or message-based web services architecture, or another suitable web services architecture.

Database clients 310 may convey web services requests to and receive responses from network-based database service 330 via network 320. Similar to network 260 described above, in various embodiments, network 320 may encompass any suitable combination of networking hardware and protocols necessary to establish web-based communications between clients 310 and network-based storage service 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given database client 310 and network-based database service 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given database client 310, delegation service 370, and the Internet as well as between the Internet and network-based storage service 330, and delegation service 370. It is noted that in some embodiments, database clients 310 may communicate with network-based database service 330 using a private network rather than the public Internet. For example, clients 310 may be provisioned within the same enterprise as the data storage service (and/or the underlying system) described herein. In such a case, clients 310 may communicate with network-based database service 330 entirely through a private network 320 (e.g., a LAN or WAN that may use Internet-based communication protocols but which is not publicly accessible).

Generally speaking, network-based database service 330 may be configured to implement one or more service endpoints configured to receive and process web services requests, such as fine-grained requests to access tables maintained on behalf of application providers and application clients by a database service or a data storage service, and/or the items and attributes stored in those tables. For example, network-based database service 330 may include hardware and/or software configured to implement various service endpoints and to properly receive and process HTTP-based web services requests directed to those endpoints. In one embodiment, network-based database service 330 may be implemented as a server system configured to receive web services requests from clients 310 and to forward them to various components that collectively implement a database system for processing. In other embodiments, network-based database service 330 may be configured as a number of distinct systems (e.g., in a cluster topology) implementing load balancing and other request management features configured to dynamically manage large-scale web services request processing loads.

As illustrated in FIG. 3, network-based database service 330 may include a front end module 340 (which may be configured to receive, authenticate, parse, throttle and/or dispatch service requests, among other things). In various embodiments, front end module 340 may implement fine-grained access control manager 342. Network-based database service 330 may also implement a component to provide administrative functions 350 (which may be configured to provide a variety of visibility and/or control functions, as described in more detail herein), and a plurality of storage node instances (shown as 360a-360n), each of which may maintain and manage one or more tables on behalf of clients/users or on behalf of the data storage service (and its underlying system) itself. Some of the functionality provided by each of these types of components is described in more detail herein, according to various embodiments. Note that in some embodiments, network-based database service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment (storing data for different clients at a same storage node instance 360), and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

Front end module 340 may include one or more modules configured to perform parsing and/or throttling of service requests, authentication and/or metering of service requests, dispatching service requests, and/or maintaining a partition map cache. In addition to these component-specific modules, front end module 340 may include components that are common to multiple types of computing nodes that collectively implement network-based services platform 200, such as a message bus and/or a dynamic configuration module. In other embodiments, more, fewer, or different elements may be included in front end module 340, or any of the elements illustrated as being included in front end module 340 may be included in another component of network-based database service 330 or in a component configured to interact with network-based database service 330 to provide the data storage services described herein.

In at least some embodiments, front end module 340 may implement fine-grained access manager module 342 which may be configured to process fine-grained access requests, such as according to the various techniques described below with regard to FIG. 7. Delegated access credentials may be received along with fine-grained access requests. Fine-grained access manager module 342 may be configured to request verification of the delegated access credential from delegation service 370. Fine-grained access manager module 342 may receive verification of the delegated access credential (or an error/notification that the delegated access credential is not valid) from delegation service 370. In some embodiments, fine-grained access manager module 342 may receive a delegation policy corresponding to the delegated access credential. For example, the corresponding delegation policy may be sent along with verification of the delegated access credential from delegation service 370. In some embodiments, fine-grained access manager module 340 may cache or maintain delegation policies for future requests. For example, a common delegation policy for a common application client (e.g., player delegation policy in a gaming application) may be cached for future fine-grained access requests.

In some embodiments, fine-grained access manager module 342 may be configured to evaluate the fine-grained access request according to the delegation policy in order to determine authorization for the fine-grained access request. Evaluation of the fine-grained access request may include analysis or application of one or more authorization rules included in the delegation policy to determine specific authorizations for the fine-grained access request. The rules can take the form of code that is evaluated in the context of the permissions to determine the appropriate authorizations, could involve simple declarative rules with support for conditional statements, or could utilize variable substitution, among other such options. For example, a listing of specific API commands or operations that can be performed, such as various types of read operations or write operations. There can be different rules for different types of fine-grained access requests, as well as specific portions of data (e.g., particular rows, columns, attributes, fields, etc . . . ) to which authorizations pertain. In some embodiments, a delegation policy may be template(s) can be used to allow mapping between the identity of the requestor of fine-grained access, information about the source of the request, and the outgoing permissions. An example template can allow access to specified data (e.g., one or more rows associated with a particular User ID or other primary key) that corresponds to the requestor or associated entity. Instead of (or in addition to) templates, another approach can be based at least in part upon a set of rules such as those discussed above. Other approaches to performing the mapping can be used as well, where the set of information provided by the third party identity provider (e.g., an identity credential which may be a User ID) is accepted as input, potentially filtered by what the delegation policy allows. In some cases there might be certain identity information that is mandatory. There might also be information about the application client obtained from the database service. The various information and attributes from the various sources can, in at least some embodiments, be passed through a rules engine that can output a delegation policy with one or more authorizations dictating what the requestor and/or an associated entity is allowed to do against application data maintained in the network-based database service 330.

Although illustrated as implemented in front end module 340, fine-grained access manager module 342 may be implemented across one or more other components in some embodiments. In some embodiments, evaluating and applying delegation policies to determine access to data may be performed after data is obtained from storage node instances 360. For example, a delegation policy might prohibit providing a credit card number or personal identification number from being provided to a particular application client associated with a role (e.g., a seller who does not actually process payment). Thus, credit card numbers or personal identification numbers may not be provided for fine-grained access requests associated with such a delegation policy. Fine-grained access module 342 may be implemented, therefore, in one or more locations that allow for such post data fetch access control processing.

Administrative functions 350 may also be implemented by network-based database service 330. These may include one or more modules configured to provide visibility and control to system administrators, or to perform heat balancing, and/or anomaly control, and/or resource allocation. Administrative functions 350 may also include an admin console, through which system administrators may interact with key value data store (and/or the underlying system). In some embodiments, admin console may be the primary point of visibility and control for the database service (e.g., for configuration or reconfiguration by system administrators). For example, admin console may be implemented as a relatively thin client that provides display and control functionally to system administrators and/or other privileged users, and through which system status indicators, metadata, and/or operating parameters may be observed and/or updated.

Storage node instances 360 may include one or more modules configured to provide partition management, to implement replication and failover processes, and/or to provide an application programming interface (API) to underlying storage. Various different ones of administrative and/or control plane operations may be performed locally (e.g., on a given storage node instance 360) based, e.g., on one or more measures of the utilization of provisioned resources on the storage devices or logical storage volumes of the storage node instance.

As noted above, different storage nodes 360 may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a leader node, performing special functions with regard to access requests directed toward the partition maintained by replica group 1. For replica group 2, however, storage node B may be the leader node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine, which may be configured to maintain (i.e. to store and manage) one or more tables, such as a lock manager table for a compute cluster, (and associated table data) in storage (which in some embodiments may be a non-relational database) on behalf of one or more clients/users. In addition to these component-specific modules, storage node instance 360 may include components that are common to the different types of computing nodes that collectively implement network-based database service 330, such as a message bus and/or a dynamic configuration module. In other embodiments, more, fewer, or different elements may be included in storage node instance 360, or any of the elements illustrated as being included in storage node instance 360 may be included in another component of network-based storage service 330 or in a component configured to interact with network-based storage service 330 to provide the data storage services described herein.

The systems underlying the database service described herein may store data on behalf of database service clients (e.g., client applications, users, and/or subscribers) in tables containing items that have one or more attributes. In some embodiments, the database service may present clients/users with a data model in which each table maintained on behalf of a client/user contains one or more items, and each item includes a collection of attributes, such as a key value data store. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, network-based database service 330 may be configured to support different types of web services requests. For example, in some embodiments, network-based storage service 330 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In various embodiments, the data storage service described herein may provide an application programming interface (API) that includes support for some or all of the following operations on the data in a table maintained by the service on behalf of a storage client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

Figure 4:
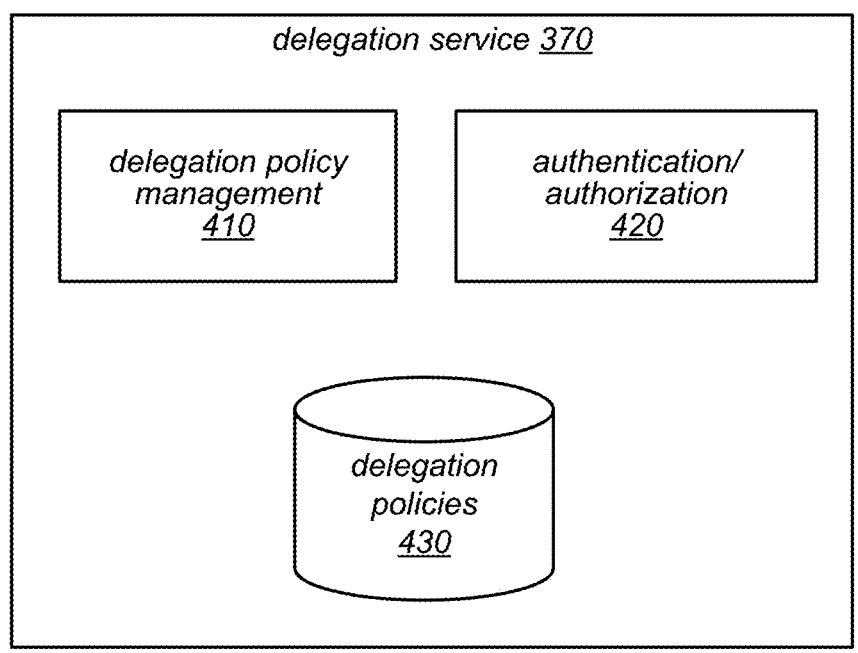
FIG. 4 is a block diagram illustrating a delegation service, according to some embodiments.

FIG. 4 is a block diagram illustrating a delegation service, according to some embodiments, which may be implemented either as part of a network-based services platform or as a standalone service. It is noted that where one or more instances of a given component may exist, reference to that component herein below may be made in either the singular or the plural. However, usage of either form is not intended to preclude the other. In various embodiments, the components illustrated in FIG. 4 may be implemented directly within computer hardware, as instructions directly or indirectly executable by computer hardware (e.g., a microprocessor or computer system), or using a combination of these techniques. For example, the components of FIG. 4 may be implemented by a distributed system including a number of computing nodes (or simply, nodes), such as computing system 2000 in FIG. 12 described below. In various embodiments, the functionality of a given computing system component may be implemented by a particular computing node or may be distributed across several computing nodes. In some embodiments, a given computing node may implement the functionality of more than one storage service system component.

In various embodiments, delegation service 370 may implement a module for delegation policy management 410. For example, delegation policy management 410 may receive a request from an application provider to create one or more delegation policies for application clients of the application provider. Delegation profiles may be created that include a name or identifier (e.g., player, administrator, recipient, analyst, reporter, etc . . . ), at least one validation policy (e.g., what users/clients may correspond to the delegation policy), and one or more authorization rules. The name can be a string or any other identifier that is used to refer to the delegation policy. The validation policy specifies which users, clients, accounts, identifiers, external entities, or other types of users are allowed to utilize the delegation policy to perform fine-grained access requests according to the delegation profile. In addition, the one or more authorization rules can indicate which specific actions the users are allowed to perform (e.g., various read and/or write operations, which particular data, such as rows, columns, attributes, fields, or other specified portions of data maintained at the database service). Created delegation policies may be stored in a data store for delegation policies 430. Further updates, additions, deletions, or other modifications may be made to delegation policies in delegation policies store 430 by application providers.

Delegation service 370 may implement authentication/authorization module 420, in various embodiments. Request for delegated access credentials for application clients may be received at delegation service 370. In various embodiments, an identity credential may be included with the request. Authentication/authorization module 420 may validate the identity credential (such as by requesting validation of the identity credential from the issuing identity provider). Authentication/authorization module 420 may be configured to determine which delegation policy corresponds to the request (and the access credentials that may be issued in response). Requests for delegated access credentials can in some embodiments include an identification of the appropriate delegation policy to use. When the delegation policy is not identified, authentication/authorization module 420 may be configured, in various embodiments, to determine the appropriate policy to use based on other information in, or associated with, the request. In an embodiment, an authentication mechanism such as PKI (Public Key Infrastructure) or SAML (security assertion markup language) might be used to assert claims with respect to the identity of an end user and/or associated entity. The certificate used to sign the request for one of these mechanisms can be associated with a particular delegation policy, and thus used as an indication of the appropriate delegation policy. After the information provided with the request is verified, various rules can be used to determine the appropriate delegation policy to be assigned, while in other embodiments the specific policy or role can be claimed as part of the request. Various other such approaches can be used as well. In some embodiments, the requests might include an identifier for the desired profile, and the users can obtain access per that profile when the mapping indicates that the profile is mapped to that end user. In some embodiments, a single profile might be able to be associated with a particular public certificate, such that the end user is limited to the profile associated with the certificate.

Figure 5:
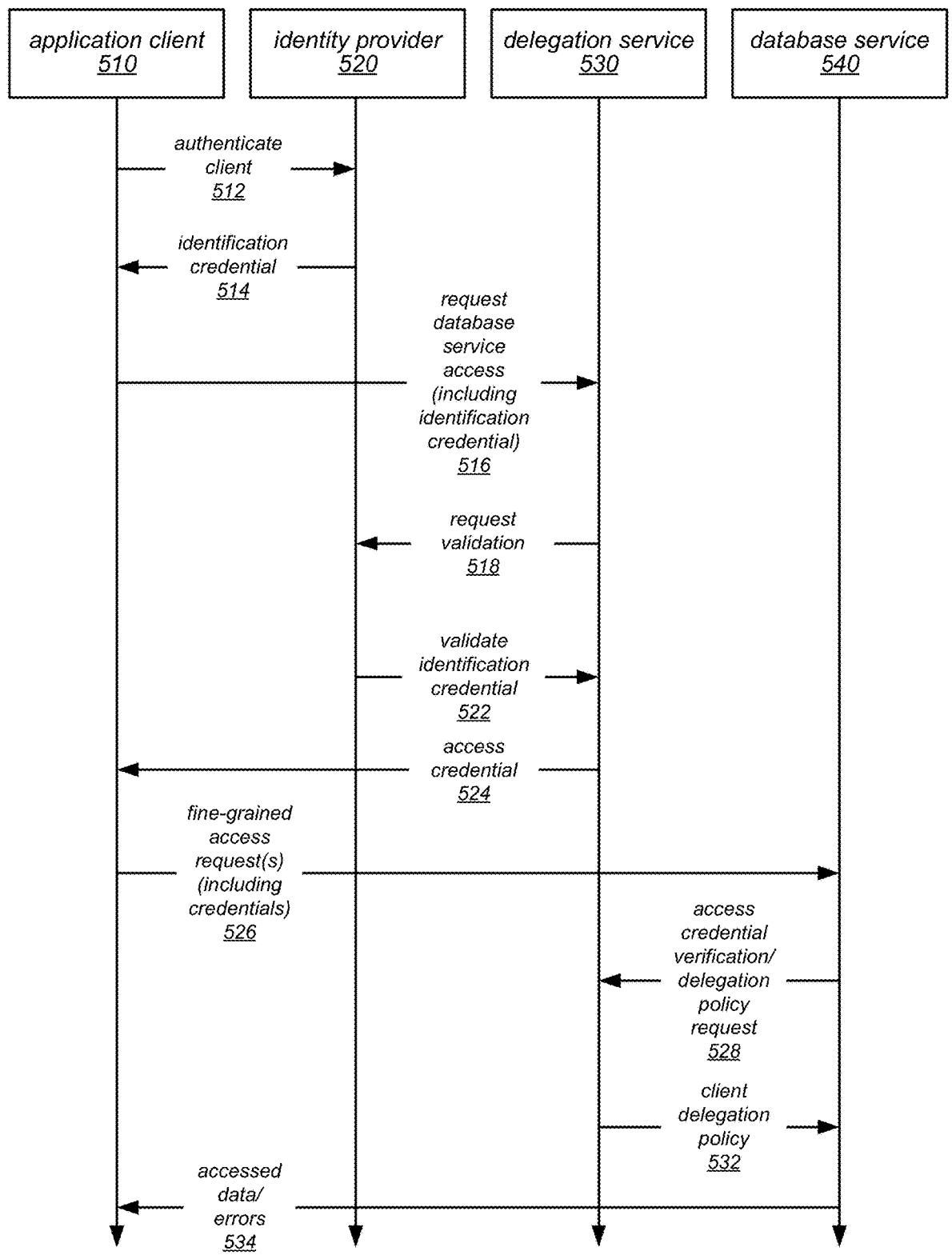
FIG. 5 is a block diagram illustrating various interactions among an application client requesting fine-grained access to data maintained at a database service, delegation service, and identity provider, according to some embodiments.

FIG. 5 is a block diagram illustrating various interactions among an application client requesting fine-grained access to data maintained at a database service, delegation service, and identity provider, according to some embodiments. Application client 510 may request authentication 512 from identity provider 520. For example, a username and password combination, or some other type of authentication protocol may be implemented by identity provider 520 to validate the identity of application client 510. In response to authenticating application client 510, identity provider 520 may send an identification credential 514 to application client 510. For example, an identity token including a cryptographic key or digital signature may be provided to application client.

In order to obtain access to application data, application client 510 may request database service access 516 from delegation service 530. The request for database access may include, in various embodiments, the identity credential issued by identity provider 520. In such cases, delegation service 530 may request identity provider 520 to provide validation 518 of the identity credential. Identity provider 520 may provide validation of the identification credential 522 to delegation service 530. After validating the identification credential, delegation service 530 may send the delegated access credential 524 to application client 510. In some embodiments, the delegation policy corresponding to the delegated access credential may be sent to application client 510 and/or to database service 540. In some embodiments, the delegation policy may be sent in response to a request for the delegation policy from database service 540.

Application client 510 may then submit a fine-grained access request 526 to database service 540 for specified application data maintained at database service 540 for an application provider. In various embodiments, the fine-grained access request 526 may include the delegated access credential (and in some embodiments, the identity credential). In response to receiving the fine-grained access request 526, database service 540 may request verification of the delegated access credential (and in some embodiments, the corresponding delegation policy). Delegation service 530 may send verification client delegation policy 532 to database service 540. Database service 540 may then evaluate the fine-grained access request according to the corresponding delegation policy. Various access data and/or error responses 534 may be sent to application client 510. In some embodiments, subsequent fine-grained access requests may be sent including the same delegated access credential so that application client 510 need not request a delegation credential for every fine-grained access requests. However, delegation credentials may, in some embodiments, expired after a given period of time, and thus a new delegation access credential may need to be acquired.

Figure 6A:
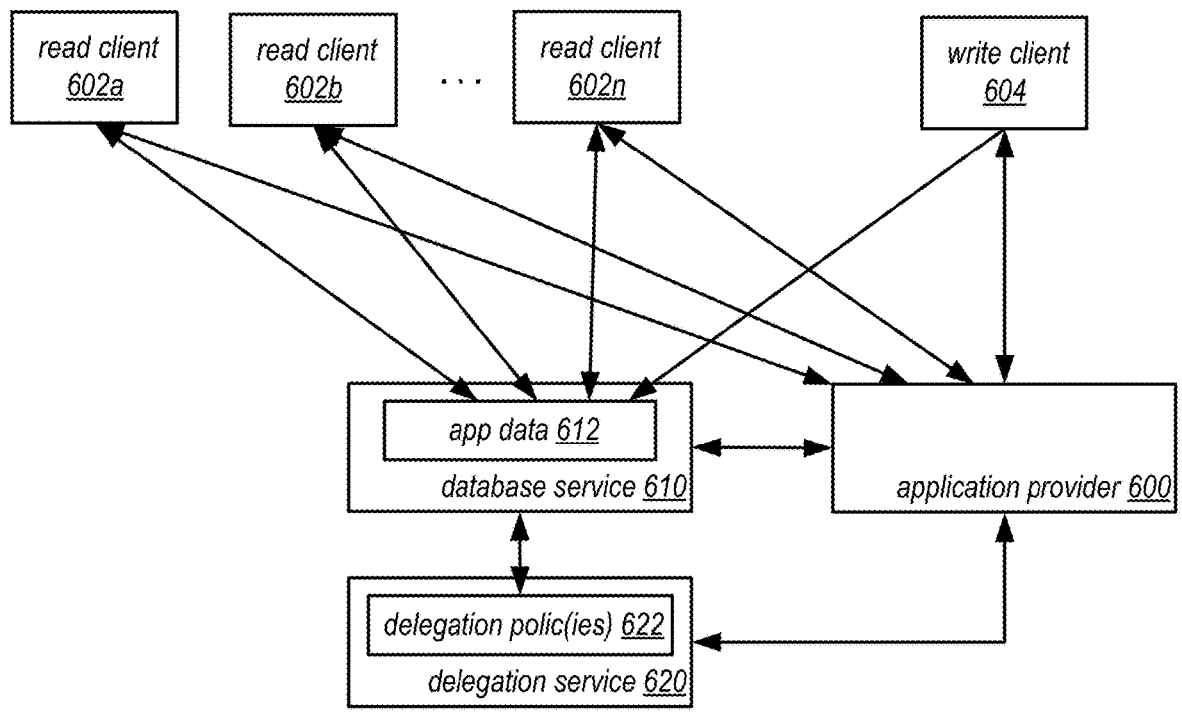
FIGS. 6A-6C are block diagrams illustrating various configurations of application clients corresponding to different delegation policies with fine-grained access to data maintained at a database service, according to some embodiments.
Figure 6B:
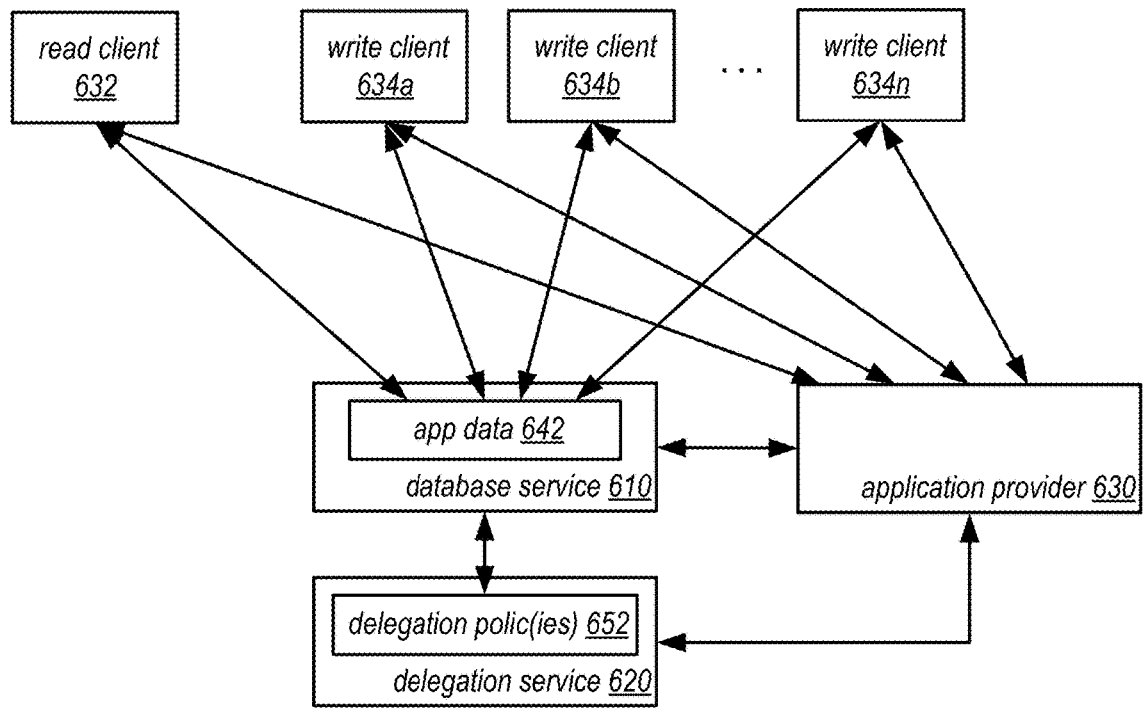
Figure 6C:
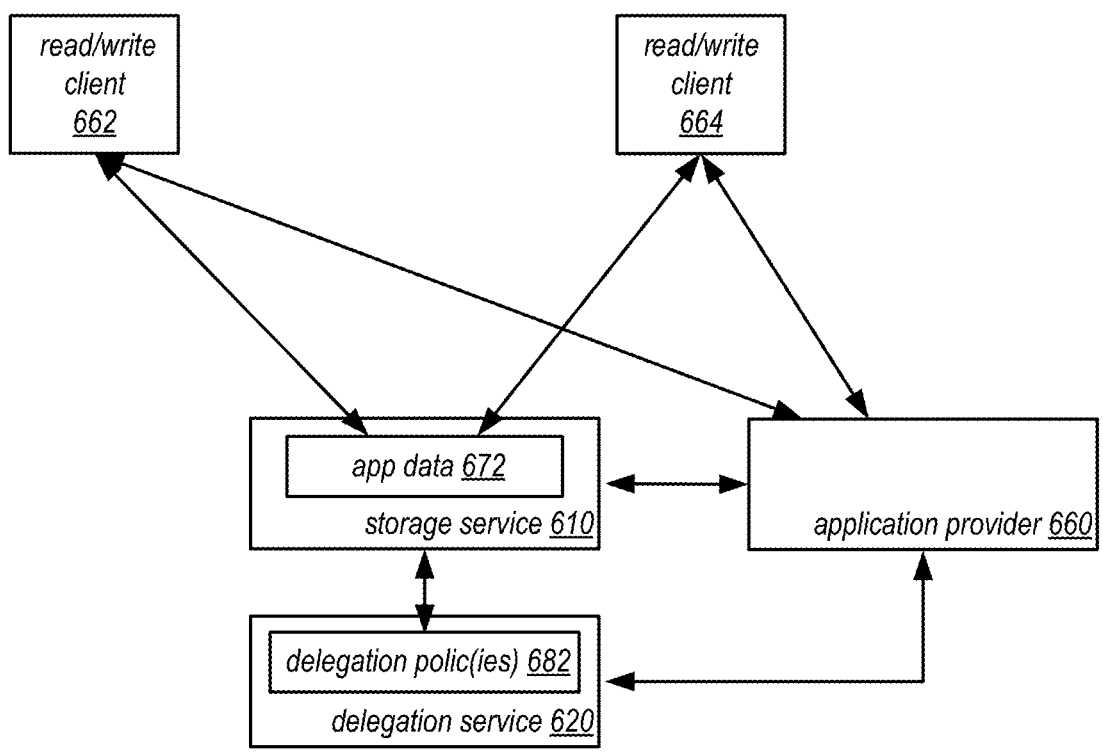

Various delegation policies may be created by application providers, in some embodiments. These delegation policies may specify different authorizations for different application clients or types of application clients. For example, FIGS. 6A-6C are block diagrams illustrating various configurations of application clients corresponding to different delegation policies with fine-grained access to data maintained at a database service, according to some embodiments. For instance, in FIG. 6A, application provider 600 may create/maintain application data 612 at database service 610 which may provide information for application clients 602a-602n and 604 to perform application functions, services, or operations. Application provider 600 may establish delegation policies 622 for delegating access to application clients 602a-602n and 604. For example, as illustrated in FIG. 6A, clients 602a, 602b through 602n may be different application clients that present different delegated access credentials to database service 610 corresponding to the same delegation policy 622, authorizing read access to application data 612. Client 604, by contrast, may present a delegated access credential that corresponds to a different delegation policy 622, authorizing write access (and possibly read access). In some embodiments, client 604 may have more coarse-grained (i.e., broader) access to application data 612 than read clients 602. Other interactions between application clients 602a-602n and 604 and application provider 600 (e.g., application updates, registrations, etc . . . ) may be performed. Various types of applications may utilize such an arrangement for fine-grained database access, such as a content delivery system, where a content provider writes data to specified locations in application data 612 so that various ones of the read clients 602a through 602n may obtain the content. In another example, a messaging application may utilize the application data as location for broadcast messages to the various read clients 602a through 602n.

FIG. 6B illustrates another example of multiple application clients with different authorizations from different delegation policies. Application provider 630 may create/maintain application data 642 at database service 610 which may provide information for application clients 634a-634n and 632 to perform application functions, services, or operations. Application provider 600 may establish delegation policies 652 for delegating access to application clients 634a-634n and 632. For example, as illustrated in FIG. 6B, clients 634a, 634b through 634n may be different application clients that present different delegated access credentials to database service 630 corresponding to the same delegation policy 652, authorizing write access to application data 642. Client 632, by contrast, may present a delegated access credential that corresponds to a different delegation policy 622, authorizing read access (and possibly write access). In some embodiments, client 632 may have more coarse-grained (i.e., broader) access to application data 642 (e.g., write clients 634 may only be able write to specific rows, columns, or fields while read client 632 may be able to read all of such rows, columns, or fields. Other interactions between application clients 634a-634n and 632 and application provider 630 (e.g., application updates, registrations, etc . . . ) may be performed. Various types of applications may utilize such an arrangement for fine-grained database access, such as information gatherers like as web-based user action analytics application that records actions for many different users implementing action trackers as write clients 634a-634n to record actions in application data 642. Read client 632 may read the collected application data 642 and perform various types of analysis on the data.

FIG. 6C is an example of two clients with different authorizations from different delegation policies. Application provider 660 may create/maintain application data 672 at database service 610 which may provide information for application clients 6662 and 664 to perform application functions, services, or operations. Application provider 660 may establish delegation policies 682 for delegating access to application clients 662 and 664. For example, as illustrated in FIG. 6C, client 662 may be authorized to perform read access to application data 672. Client 664, by contrast, may present a delegated access credential that corresponds to a different delegation policy 622, authorizing write access. Alternatively, both clients 662 and 664 may have read and write access, which may be to the same or different portions of application data 672. Other interactions between application clients 662 and 664 application provider 660 (e.g., application updates, registrations, etc . . . ) may be performed. Various types of applications may utilize such an arrangement for fine-grained database access, such as secure messaging services, that store messages in application data 672, or maintaining user settings or application state information in application data 672.

The examples of providing fine-grained database access using federated identity management to FIGS. 2-6C have been given in regard to a network-based platform providing a database service and a delegation service. However, various other types of databases that may be implemented as separate or standalone distributed databases may provide fine-grained access using a delegation service. FIG. 7 is a high-level flowchart illustrating various methods and techniques for providing fine-grained access to a database using federated identity management, according to some embodiments. These techniques may be implemented using databases and/or a delegation service as described above with regard to FIGS. 2-6C, as well as other databases and/or different implementations of a delegation service for providing fine-grained database access, and thus the following discussion is not intended to be limiting as to the other types or configurations of databases or delegation services that may implement the described techniques. Similarly, although the term database system or service is regularly used throughout the description of FIGS. 7-11, a structured data store may also be used to implement the various techniques and methods described below, such as various types of caching storage services, or other data stores that implement a structure for data storage so that fine-grained access to portions of the data store may be implemented. Thus, the term database system is not intended to be limiting as to other types of structured data stores performing the various techniques discussed below.

As indicated at 710, a fine-grained access request may be received at a database service for a specified portion of data maintained at the database service for an application provider and a delegated access credential for the fine-grained access request, according to various embodiments. A fine grained-access request may be formatted according to various APIs or other protocols for communication between an application client and a database service. The fine-grained access request may be received directly from the application client, in some embodiments. For example, if the application provider also provides a middle tier supporting other application services, functions, or operations (e.g., updates, registrations, other content, etc . . . ), the fine-grained access request may be received from the application client without involvement of the middle tier of the application provider.

In various embodiments, verification of the delegated access credential may be obtained from a delegation service, as indicated at 720. For example, the delegated access credential may be sent to the delegation service for verification. In some embodiments, the delegated access credential may have been issued by the delegation service. Alternatively, in some embodiments a separate service may have issued the delegated access credential, but the delegation service may be capable of verifying the credential. Verification of the delegated access credential may then be received back from the delegation service. In some embodiments, a delegation policy corresponding to the delegated access credential may also be received from the delegation service, or an identification of the delegation policy (such that a correct cached delegation policy corresponding to the delegated access credential may be used to for evaluating the fine-grained access request).

As indicated at 730, the fine-grained access request may be evaluated according to a delegation policy corresponding to the delegated access credential from a delegation service, in some embodiments. Evaluation may include analysis or application of one or more authorization rules included in the delegation policy to determine specific authorization rules for the fine-grained access request. Thus, for example, if the delegation policy allows for one or more types of read operations, then the fine-grained access request may lack authorization if the fine-grained access request is a request to perform a write operation (even if the delegation policy would have allowed read operations for the specific portion of data). In some embodiments, various examples of write operations may include, but are not limited to, updating or inserting new data, overwriting old data, or any other type of data modification. Similarly, in some embodiments, various types of read operations may generally involve reading different portions of data. In various embodiments, the authorization rules can take the form of code that is evaluated in the context of the permissions to determine the appropriate authorizations, could involve simple declarative rules with support for conditional statements, or could utilize variable substitution, among other such options. For example, a listing of specific API commands or operations that can be performed, such as various types of read operations or write operations. There can be different rules for different types of fine-grained access requests, as well as specific portions of data (e.g., particular rows, columns, attributes, fields, etc . . . ) to which authorizations pertain. In some embodiments, other techniques for evaluating the fine-grained access request may implemented, such as a delegation policy may be template(s) can be used to allow mapping between the identity of the requestor of fine-grained access, information about the source of the request, and the outgoing permissions. An example template can allow access to specified data (e.g., one or more rows associated with a particular User ID or other primary key) that corresponds to the requestor or associated entity. Instead of (or in addition to) templates, another approach can be based at least in part upon a set of rules such as those discussed above. Other approaches to performing the mapping can be used as well, where the set of information provided by the third party identity provider (e.g., an identity credential which may be a User ID) is accepted as input, potentially filtered by what the delegation policy allows. In various embodiments, the fine-grained access request may be evaluated without accessing local user permission data maintained for the database. The delegation policy, the identity information, access credentials, or other information, used to evaluate the fine-grained access request may be obtained from other sources, such as the application client, the delegation service, application provider and/or an identity provider.

For authorized fine-grained access requests, as indicated by the positive exit from element 740, access may be provided to the data in order to service the fine-grained access request 750. For example, if the fine-grained access request is to perform a write operation, then the write operation may be performed (and confirmation may be sent to the application client). If, another example, the fine-grained access request is to perform a read operation, then the requested data may be returned to the application client. For unauthorized fine-grained access requests, as indicated by the negative exit from element 740, an access request denial may be sent, as indicated at 760.

Figure 7:
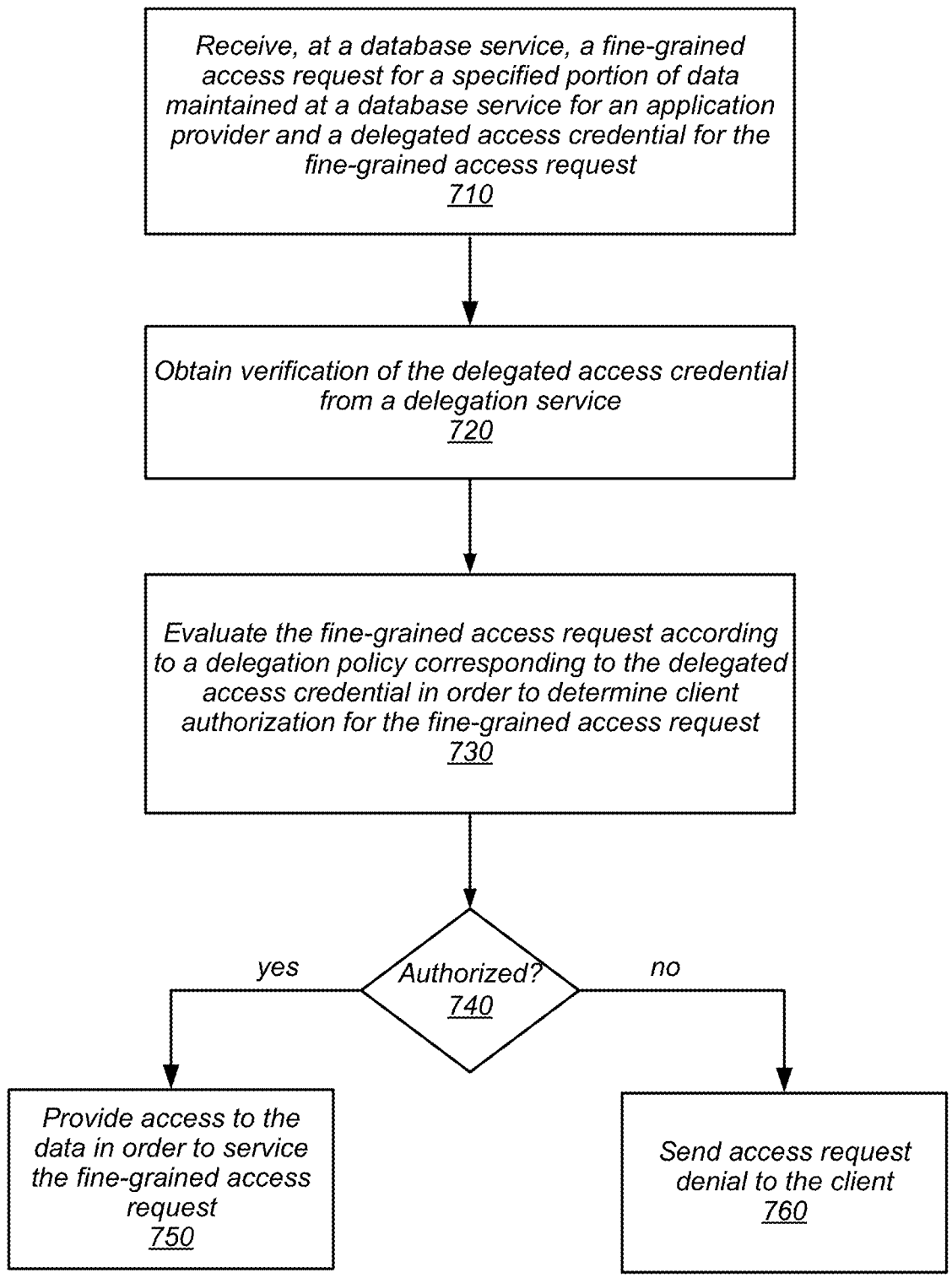
FIG. 7 is a high-level flowchart illustrating various methods and techniques for providing fine-grained access to a database using federated identity management, according to some embodiments.

The method and techniques illustrated in FIG. 7 may be performed for multiple fine-grained access requests. As multiple different delegation policies may be created for clients to access application data, different fine-grained access requests with the same or different access credentials may be received. Similarly, the same application client may provide different access credentials corresponding to different delegation policies for different fine-grained access requests.

Figure 8:
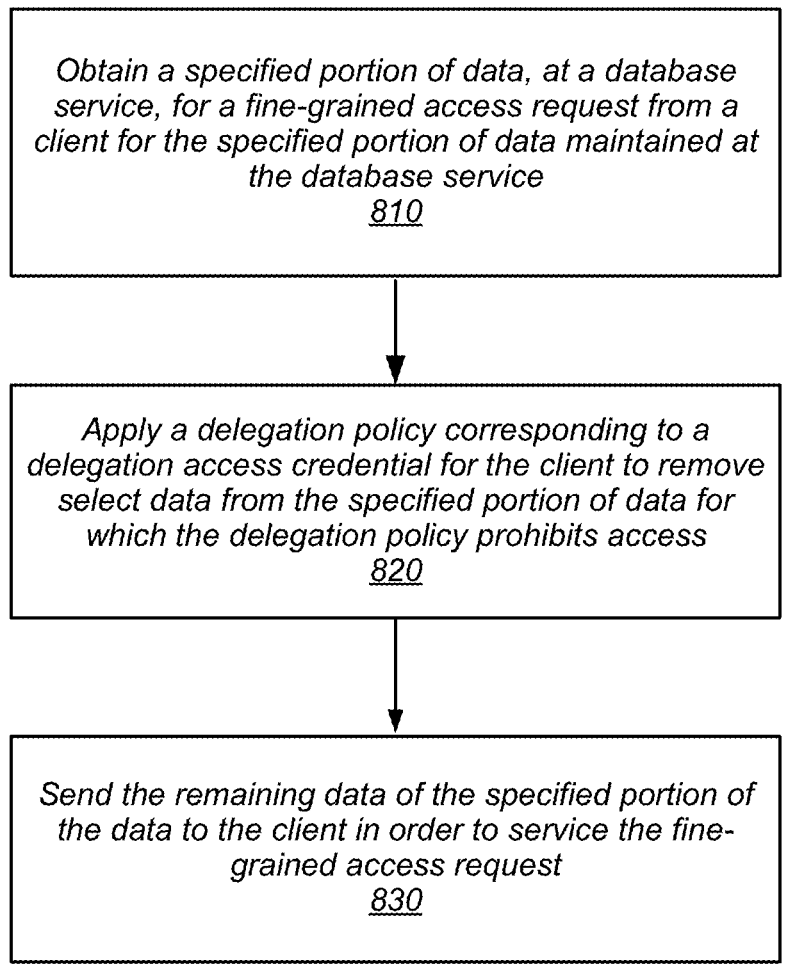
FIG. 8 is a high-level flowchart illustrating various methods and techniques for applying delegation policies to data obtained for a fine-grained access request prior to providing access to the obtained data, according to some embodiments.

FIG. 8 is a high-level flowchart illustrating various methods and techniques for applying delegation policies to data obtained for a fine-grained access request prior to providing access to the obtained data, according to some embodiments. For example, fine grained access request evaluations according to delegation policies may occur, in some embodiments, after the data is already obtain from storage (but prior to providing access to an application client). As indicated at 810, a specific portion of data may be obtained at a database service for a fine-grained access request from a client for the specified portion of data maintained at the database service. For example, a read fine-grained read request may be received and the requested data sent from one of more various storage locations to a access control manager. As indicated at 820, the delegation policy may be applied to remove or filter data out from the obtained specified portion of data for which the delegation policy prohibits access. For example, a delegation policy may prohibit access to certain kinds of information, personal information, financial information, private communications, etc . . . . In some embodiments, the delegation policy may be applied by evaluating the data itself (e.g., parsing string values, checking for number patterns, such as social security numbers, bank account numbers, routing numbers, or credit card numbers)) to determine whether a portion of the data may be removed. In some embodiments, metadata describing fields or attributes in a data store may be evaluated to determine whether or not data for the field may be prohibited by a delegation policy. As indicated at 830, remaining data of the specified portion of data may then be sent to a client in order to service the fine-grained access request, in various embodiments.

Figure 9:
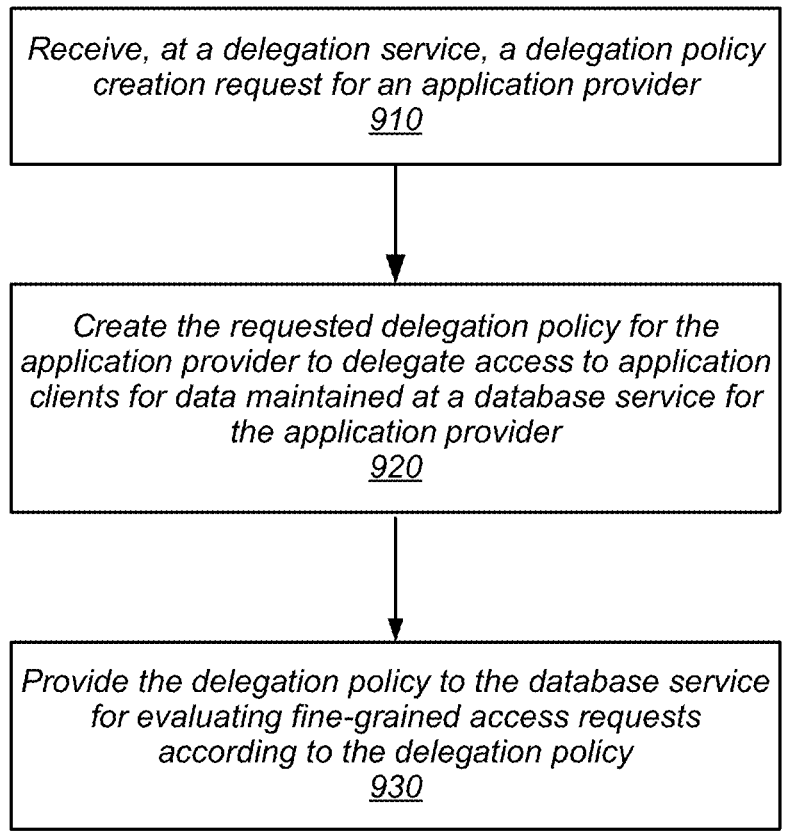
FIG. 9 is a high-level flowchart illustrating various methods and techniques for establishing a delegation profile, according to some embodiments.

FIG. 9 is a high-level flowchart illustrating various methods and techniques for establishing a delegation profile at a delegation service, according to some embodiments. As indicated at 910, a delegation policy creation request for an application provider may be received, according to some embodiments. An application provider may create multiple delegation policies for application data maintained at a database service. The delegation policy creation request may include the various components of the delegation policy to be created, including a name or identifier (e.g., player, administrator, recipient, analyst, reporter, etc . . . ) for the delegation policy, at least one validation policy (e.g., what users/clients may correspond to the delegation policy) to identify which delegated access credential corresponds to the delegation policy, and one or more authorization rules (e.g., specific operations allowed for specific locations in application data).

As indicated at 920, the request delegation policy may be created to delegate access to application clients for data maintained at a database service for the application provider, in some embodiments. As indicated at 930, the delegation policy may be provided to the database service for evaluating fine-grained access requests according to the delegation policy, in some embodiments. The delegation policy may be provided when a delegated access credential is provided to an application client, or may be provided to a database service in response to a request for verification of the delegated access credential.

Figure 10:
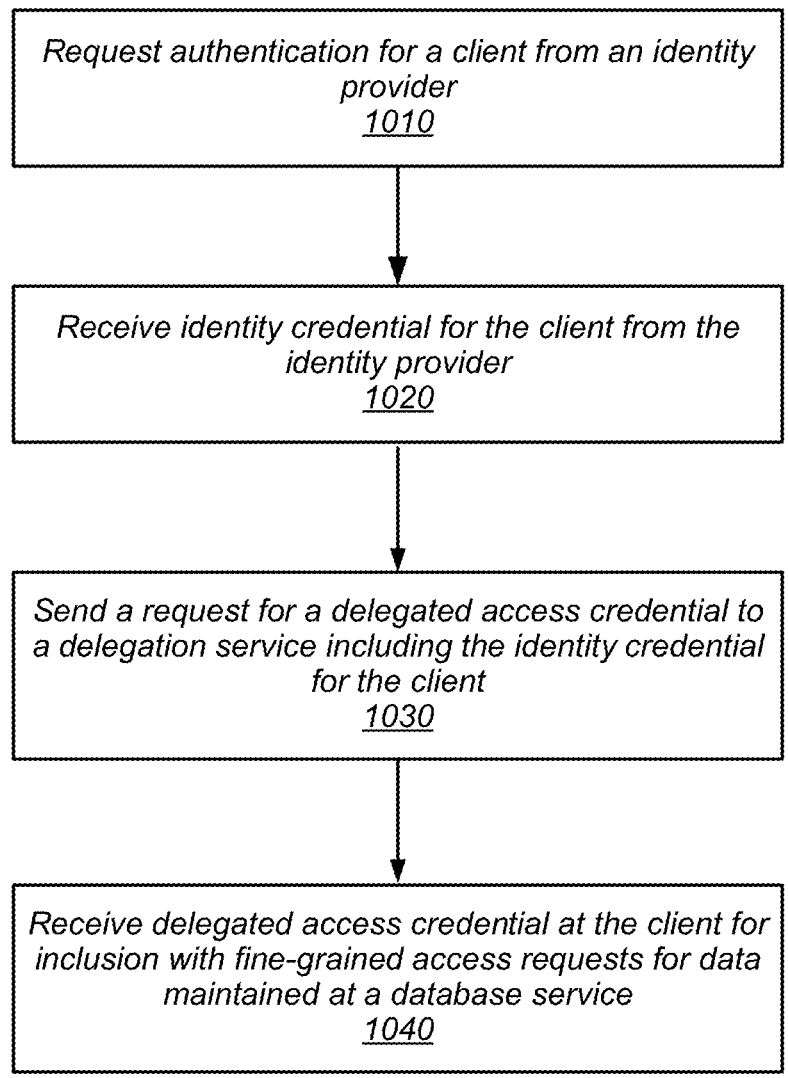
FIG. 10 is a high-level flowchart illustrating various methods and techniques for obtaining access credentials for fine-grained access to a database using federated identity management, according to some embodiments.

FIG. 10 is a high-level flowchart illustrating various methods and techniques for obtaining access credentials for fine-grained access to a database using federated identity management, according to some embodiments. As indicated at 1010, authentication for a client from an identity provider may be requested, in some embodiments. The identity provider, as discussed above, may have a previously established trust relationship with the delegation service. The identity provider may be a third-party identity provider use to provide web federated identity management, in some embodiments. The identity provider may implement various authentication techniques, such as username and password, security question and answer, captcha field, etc. to authenticate the identity of the application client. In various embodiments, an identity credential, such as an identity token, for the client may be received from the identity provider, as indicated at 1020. As indicated at 1030, a request for a delegated access credential may be sent to a delegation service including the identity credential for the client, in some embodiments. The delegated access credential may be received at the client for inclusion with fine-grained access requests for data maintained at the database service, as indicated at 1040.

Figure 11:
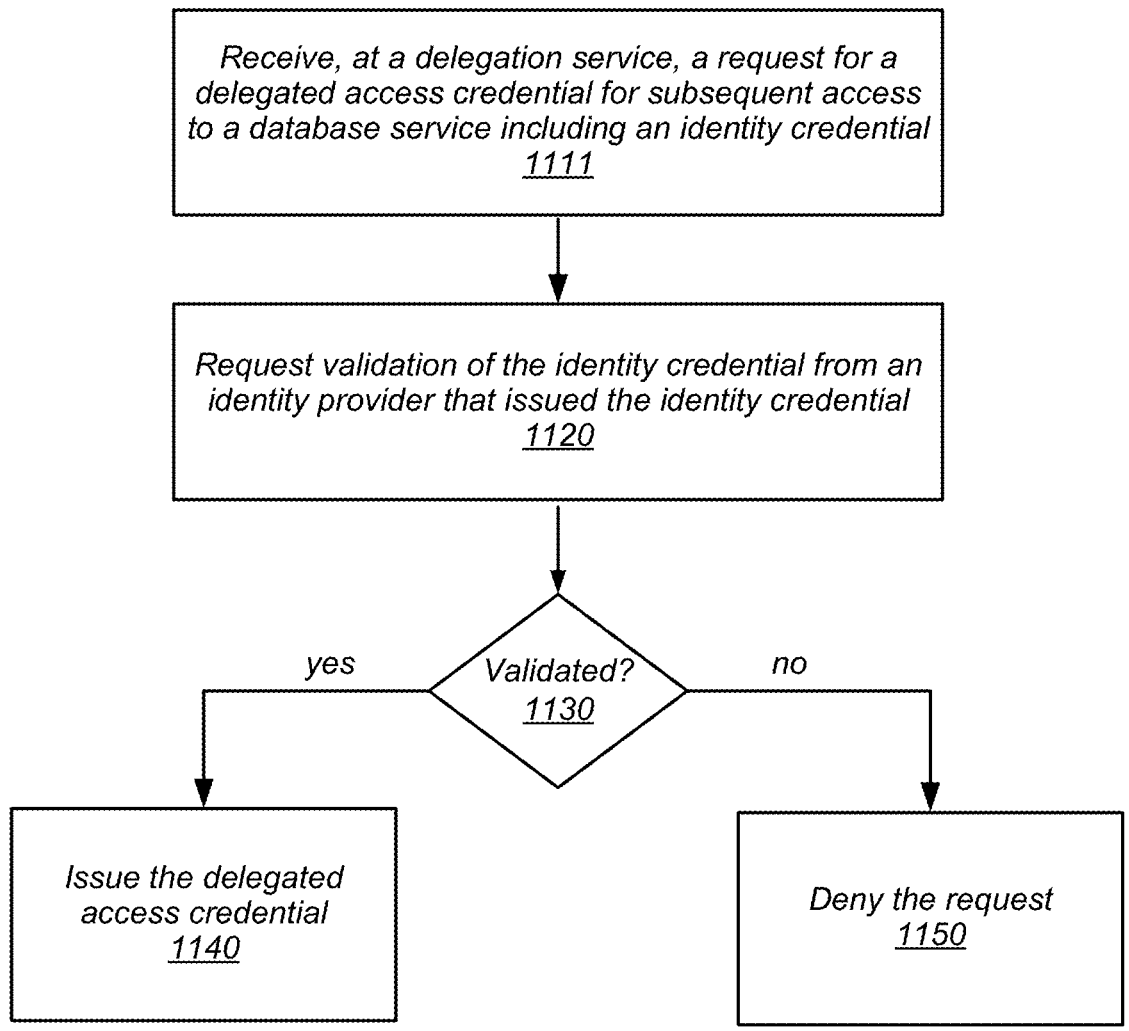
FIG. 11 is a high-level flowchart illustrating techniques for validating access credentials for a fine-grained access request, according to some embodiments.

FIG. 11 is a high-level flowchart illustrating techniques for validating access credentials for a fine-grained access request, according to some embodiments. As indicated at 1110, a request for a delegated access credential may be received at a delegation service for subsequent access to a database service including the identity credential, in some embodiments. The identity credential may be an identity token, or some other indicator of identity which may be validated at either the delegation service, or by the identity provider that issued the identity credential. As indicated at 1120, validation of the identity credential may be requested from the identity provider that issued the identity credential, in some embodiments. If the identity credential is validated, as indicated by the positive exit from element 1130, the delegated access credential may be issued, as indicated at 1140. The delegated access credential may include identification of the corresponding delegation policy, in some embodiments. If the identity credential is validated, as indicated by the negative exit from element 1130, the delegated access credential request may be denied, as indicated at 1150.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the structured data store services/systems and/or delegation services/systems described herein). The various methods as illustrated in the figures and described herein represent example embodiments of methods. The order of any method may be changed, and various elements may be added, reordered, combined, omitted, modified, etc.

Embodiments of fine-grained structured data store access using federated identity management as described herein may be executed on one or more computer systems, which may interact with various other devices. FIG. 12 is a block diagram illustrating an example computer system, according to various embodiments. For example, computer system 2000 may be configured to implement nodes of a delegation service, a structured data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database service, delegation service, application provider, application client, or identity provider in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more hardware processors; and
memory storing program instructions that when executed implement a delegation service to:
receive one or more initial requests from an application provider to establish a delegation policy for accessing application data of an application stored in a database, and in response:
create and store the delegation policy, wherein the delegation policy specifies (a) one or more users, accounts, or clients of the application that are authorized to use the delegation policy, and (b) authorization rules that allow access to fine-grained access requests to read or write different subsets of a table in the database for individual ones of the one or more users, accounts, or clients, wherein the fine-grained access requests correspond an application programming interface (API) of the application;
after the establishment of delegation policy, receive a first request from a client of the application for a delegated access credential to access the database, wherein the first request includes an identity credential that identifies a user of the application, and in response:
verify the identity credential with an identity provider that issued the identity credential;
issue the delegated access credential for the user, wherein the delegated access credential is associated with at least one of the one or more authorization rules in the delegation policy; and
send the delegated access credential to the client; and
after the issuance of the delegated access credential, receive a second request from the database, wherein the second request includes the delegated access credential issued by the delegation service, and in response:
verify the delegated access credential; and
in response to the verification of the delegated access credential, send the delegation policy to the database, wherein the database is configured to use the delegation policy to determine whether an access request to the table submitted with the delegated access credential is authorized.

2. The system of claim 1, wherein the delegated access credential includes an identification of the delegation policy.

3. The system of claim 1, wherein the identity provider is a social media service, email service, or e-commerce service.

4. The system of claim 3, wherein the program instructions are further executable to cause the delegation service to:
deny a third request for another delegated access credential based at least in part on a determination that another identity credential included in the third request is not verified.

5. The system of claim 1, wherein the program instructions are further executable to cause the delegation service to create the delegation policy to specify an authorization rule to restrict access to specified columns, fields, or attributes in the table.

6. The system of claim 1, wherein the identity credential comprises a public certificate, and the program instructions are further executable to cause the delegation service to select the delegation policy for the delegated access credential based at least in part on the public certificate.

7. The system of claim 1, wherein the program instructions are further executable to cause the delegation service to
store the delegation policy in a key value data store.

8. The system of claim 1, wherein the program instructions are further executable to cause the delegation service to create the delegation policy to specify an authorization rule that authorizes access to an individual row of the table corresponding to an individual user of the application.

9. The system of claim 1, wherein the program instructions are further executable to cause the delegation service to create the delegation policy to specify an authorization rule that includes a conditional statement.

10. A computer-implemented method, comprising:
performing, by a delegation service implemented by one or more computers:
receiving one or more initial requests from an application provider to establish a delegation policy for accessing application data of an application stored in a database, and in response:
creating and storing the delegation policy, wherein the delegation policy specifies (a) one or more users, accounts, or clients of the application that are authorized to use the delegation policy, and (b) authorization rules that allow access to fine-grained access requests to read or write different subsets of a table in the database for individual ones of the one or more users, accounts, or clients, wherein the fine-grained access requests correspond an application programming interface (API) of the application;
after the establishment of delegation policy, receiving a first request from a client of the application for a delegated access credential to access the database, wherein the first request includes an identity credential that identifies a user of the application, and in response:
verifying the identity credential with an identity provider that issued the identity credential;
issuing the delegated access credential for the user, wherein the delegated access credential is associated with at least one of the one or more authorization rules in the delegation policy; and
sending the delegated access credential to the client; and
after the issuance of the delegated access credential, receiving a second request from the database, wherein the second request includes the delegated access credential issued by the delegation service, and in response:
verifying the delegated access credential; and
in response to the verification of the delegated access credential, sending the delegation policy to the database, wherein the database is configured to use the delegation policy to determine whether an access request to the table is submitted with the delegated access credential is authorized.

11. The method of claim 10, wherein the delegated access credential includes an identification of the delegation policy.

12. The method of claim 10, further comprising causing the delegation policy to expire based at least in part on the passage of a specified period of time.

13. The method of claim 10, wherein the identity provider is a social media service, email service, or e-commerce service.

14. The method of claim 13, further comprising:
receiving a third request for another delegated access credential, the third request including another identity credential;
determining from an identity provider that the other identity credential is not validated; and
denying the third request for the other delegated access credential.

15. The method of claim 13, wherein the identity credential comprises a public certificate, the method further comprising:
determining the delegation policy for the delegated access credential based at least in part on the public certificate.

16. A non-transitory computer-readable storage medium storing program instructions that when executed by one or more hardware processors cause the one or more hardware processors to implement a delegation service and cause the delegation service to:
receive one or more initial requests from an application provider to establish a delegation policy for accessing application data of an application stored in a database, and in response:
create and store the delegation policy, wherein the delegation policy specifies (a) one or more users, accounts, or clients of the application that are authorized to use the delegation policy, and (b) authorization rules that allow access to fine-grained access requests to read or write different subsets of a table in the database for individual ones of the one or more users, accounts, or clients, wherein the fine-grained access requests correspond an application programming interface (API) of the application;
after the establishment of delegation policy, receive a first request from a client of the application for a delegated access credential to access the database, wherein the first request includes an identity credential that identifies a user of the application, and in response:
verify the identity credential with an identity provider that issued the identity credential;
issue the delegated access credential for the user, wherein the delegated access credential is associated with at least one of the one or more authorization rules in the delegation policy; and
send the delegated access credential to the client; and
after the issuance of the delegated access credential, receive a second request from the database, wherein the second request includes the delegated access credential issued by the delegation service, and in response:
verify the delegated access credential; and
in response to the verification of the delegated access credential, send the delegation policy to the database, wherein the database is configured to use the delegation policy to determine whether an access request to the table submitted with the delegated access credential is authorized.

17. The non-transitory computer-readable storage medium of claim 16, wherein the identity provider is a social media service, email service, or e-commerce service.

18. The non-transitory computer-readable storage medium of claim 16, wherein the program instructions when executed by the one or more hardware processors further cause the one or hardware more processors to update the delegation policy to specify an authorization rule that includes a conditional statement.

19. The non-transitory computer-readable storage medium of claim 16, wherein the program instructions when executed by the one or more hardware processors further cause the one or more hardware processors to:

store the delegation policy in a key value data store.

20. The non-transitory computer-readable storage medium of claim 19, wherein the program instructions when executed by the one or more hardware processors further cause the one or more hardware processors to cause the delegation policy to expire based at least in part on the passage of a specified period of time.

* * * * *